US011516179B2

(12) United States Patent
Jose et al.

(10) Patent No.: US 11,516,179 B2
(45) Date of Patent: Nov. 29, 2022

(54) AUTOMATIC RECOVERY FROM DUPLICATE NETWORK ADDRESSES

(71) Applicant: Juniper Networks, Inc., Sunnyvale, CA (US)

(72) Inventors: Jimmy Jose, Hosur (IN); Pranavadatta D N, Bangalore (IN); Reji Thomas, Bangalore (IN)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 16/138,767

(22) Filed: Sep. 21, 2018

(65) Prior Publication Data

US 2020/0099654 A1 Mar. 26, 2020

(51) Int. Cl.
*H04L 61/5046* (2022.01)
(52) U.S. Cl.
CPC .............. *H04L 61/5046* (2022.05)
(58) Field of Classification Search
CPC .................................................. H04L 61/2046
USPC ........................................................ 709/245
See application file for complete search history.

(56) References Cited

U.S. PATENT DOCUMENTS

| 7,646,783 | B2 | 1/2010 | Uchida |
| 8,316,137 | B2 | 11/2012 | Tremaine et al. |
| 10,063,675 | B2 | 8/2018 | Thomas et al. |
| 2003/0026230 | A1* | 2/2003 | Ibanez ............. H04L 29/12264 370/338 |
| 2004/0240474 | A1* | 12/2004 | Fan ................... H04L 29/12009 370/475 |
| 2006/0085851 | A1 | 4/2006 | Heninger et al. |
| 2008/0263353 | A1* | 10/2008 | Droms ............. H04L 29/12283 713/153 |

(Continued)

FOREIGN PATENT DOCUMENTS

CN        1761263 A       4/2006
CN       102067570 A      5/2011

(Continued)

OTHER PUBLICATIONS

Youngsong Mun and Hyewon Keren Lee, "Understanding IPv6", books.google.com, 2005 (Year: 2005).*

(Continued)

*Primary Examiner* — Umar Cheema
*Assistant Examiner* — John Fan
(74) *Attorney, Agent, or Firm* — Shumaker & Sieffert, P.A.

(57) ABSTRACT

A network device in a network may determine a tentative network address for a network interface of the network device and may determine whether the tentative network address is duplicative of any one of the network addresses in the network. If the tentative network address is duplicative of a network address assigned to another network interface in the network, the network device may store an indication of the other network interface. In response to receiving an indication that a new network address is assigned to the other network interface, the network device may re-determine whether the tentative network address is duplicative of any one of the network addresses in the network. If the network device determines that the tentative network address is not duplicative of any one of the plurality of network addresses in the network, the network device may assign the tentative network address to the network interface.

17 Claims, 7 Drawing Sheets

(56) References Cited

U.S. PATENT DOCUMENTS

2010/0322420 A1* 12/2010 Al-Banna ............ H04L 12/2801
  380/255
2015/0134804 A1* 5/2015 Yagiu .................. H04L 61/2046
  709/223
2015/0288654 A1* 10/2015 Al-Banna ............ H04L 61/2092
  713/163

FOREIGN PATENT DOCUMENTS

CN          107241455 A     10/2017
JP          2006253811 A     9/2006

OTHER PUBLICATIONS

Thomson et al., "IPv6 Stateless Address Autoconfiguration," Network Working Group, RFC 4862, Sep. 2007, 30 pp.

Response to Extended Search Report dated Jan. 10, 2020 from counterpart European Application No. 19183174.2, filed Sep. 24, 2020, 15 pp.

Notice of Intent to Grant and Text Intended to Grant from counterpart European Application No. 19183174.2, dated Dec. 17, 2020, 57 pp.

Notice of Intent to Grant and Text Intended to Grant from counterpart European Application No. 19183174.2, dated May 7, 2021, 56 pp.

First Office Action and Search Report, and translation thereof, from counterpart Chinese Application No. 201910885997.6 dated Oct. 29, 2021, 10 pp.

Extended Search Report from counterpart European Application No. 19183174.2, dated Jan. 10, 2020, 8 pp.

Bing, ""Deleted" flag in neighbor advertisement; draft-yhb-6man-nd-improvement-OO.txt," Networking Working Group: Internet-Draft, Jan. 11, 2011, 3 pp.

* cited by examiner

AUTOMATIC RECOVERY FROM DUPLICATE NETWORK ADDRESSES

TECHNICAL FIELD

The disclosure relates to computer networks and, more particularly, to network addresses of network devices within computer networks.

BACKGROUND

A computer network is a collection of interconnected network devices that exchange data and share resources. The network devices may be implemented as physical devices, such as desktop computers, servers, and network appliances, or may be deployed as virtual devices, such as virtual machines executing on virtualization infrastructure. In some networks, each network interface of the virtual or physical network device is assigned a unique hardware address, such as a Media Access Control (MAC) address.

A network device may autoconfigure its network interface in accordance with Internet Protocol version 6 (IPv6) when the network device joins a network segment of a computer network. For example, the network device may generate a link-local address for the network interface, which is a network address for the network interface that is valid only for communications within the network segment to which the network device is connected. The network device may also generate a global network address that is valid for communications within a network beyond the network segment. Because the network device may generate the link-local address prior to receiving indications of the link-local addresses associated with other network interfaces in the network segment, it is possible the network device may generate a link-local address that is already associated with another network interface in the network segment. Thus, when the network device generates a link-local address, the network device may perform duplicate address detection to verify the uniqueness of the link-local address within the network segment. Details of performing duplicate address detection are described in S. Thomson et al., "IPv6 Stateless Address Autoconfiguration," Network Working Group Request for Comments (RFC) 4862, September 2007.

SUMMARY

In general, this disclosure describes techniques for automatically recovering when a network address for the network interface of a network device in a network segment is determined to be a duplicate of a network address that is already assigned to another network interface in the network segment.

The techniques described herein may provide one or more advantages. By performing automatic recovery to resolve instances when a network address for the network interface of a network device in a network segment is determined to be a duplicate of a network address that is already assigned to another network interface in the network segment, the techniques described herein may reduce the amount of manual intervention that may be required by administrators of network devices and network interfaces connected to the network segment to perform such recovery.

Further, by reducing the amount of manual intervention required, the techniques described herein may also reduce the amount of time it may take to resolve duplicate network addresses that are assigned to network interfaces within a network segment. In contrast, when manual intervention is required, an administrator may not be immediately aware of a duplicate network address situation nor be immediately able to perform manual recovery from the duplicate network address, thereby delaying recovery from a duplicate link-local address.

In situations where network devices in a network segment may exist in different data centers, different internet service providers, different cloud providers, different vendors, and/or different administrative domains, it may be difficult and time consuming for different administrators in each of these data centers, service providers, vendors, administrative domains, and the like, to communicate and coordinate with each other in a timely fashion to resolve the duplicate network addresses. By being able to resolve instances when a network address for the network interface of a network device in a network segment is determined to be a duplicate of a network address that is already assigned to another network interface in the network segment to generate valid, non-conflicting network addresses for the network interface, the techniques described herein may reduce the amount of time it may take and may reduce or eliminate the potential need for administrators to communicate or coordinate in order for a network device to recover from generating a duplicate network address for a network interface, and in order for the network device to generate a valid network address to the network interface.

In one aspect, the disclosure is directed to a method. The method includes determining, by a network device of in a network segment, a tentative network address for a first network interface associated with the network device. The method further includes determining, by the network device, whether the tentative network address is duplicative of any one of a plurality of network addresses assigned to a plurality of other network interfaces associated with a plurality of other network devices in the network segment. The method further includes in response to determining that the tentative network address is duplicative of a network address assigned to a second network interface of the plurality of other network interfaces, storing, by the network device, an indication of the second network interface. The method further includes in response to receiving an indication that a new network address is assigned to the second network interface, re-determining, by the network device, whether the tentative network address is duplicative of any one of the plurality of network addresses assigned to the plurality of other network interfaces associated with the plurality of other network devices in the network segment. The method further includes in response to determining that the tentative network address is not duplicative of any one of the plurality of network addresses assigned to the plurality of other network interfaces associated with the plurality of other network devices in the network segment, assigning, by the network device, the tentative network address to the first network interface.

In another aspect, the disclosure is directed to a network device. The network device includes a first network interface connectable to a network segment. The network device further includes a memory. The network device further includes processing circuitry operably coupled to the memory and the network interface. The processing circuitry is configured to determine a tentative network address in the network segment for the first network interface of the network device. The processing circuitry is further configured to determine whether the tentative network address is duplicative of any one of a plurality of network addresses assigned to a plurality of other network interfaces associated with a plurality of other network devices in the network segment. The processing circuitry is further configured to, in response to determining that the tentative network address is duplicative of a network address assigned to a second network interface of the plurality of other network interfaces, store an indication of the second network interface in the memory. The processing circuitry is further configured to, in response to receiving an indication that a new network address is assigned to the second network interface, re-determine whether the tentative network address is duplicative of any one of the plurality of network addresses assigned to the plurality of other network interfaces associated with the plurality of other network devices in the network segment. The processing circuitry is further configured to, in response to determining that the tentative network address is not duplicative of any one of the plurality of network addresses assigned to the plurality of other network interfaces associated with the plurality of other network devices in the network segment, assign the tentative network address to the first network interface.

In another aspect, the disclosure is directed to a non-transitory computer-readable storage medium of a network device storing instructions. The instructions, when executed by processing circuitry of the network device, cause the processing circuitry of the network device to determine a tentative network address in a network segment for a first network interface associated with the network device. The instructions, when executed by the processing circuitry of the network device, further cause the processing circuitry of the network device to determine whether the tentative network address is duplicative of any one of a plurality of network addresses assigned to a plurality of other network interfaces associated with a plurality of other network devices in the network segment. The instructions, when executed by the processing circuitry of the network device, further cause the processing circuitry of the network device to, in response to determining that the tentative network address is duplicative of a network address assigned to a second network interface of the plurality of other network interfaces, store an indication of the second network interface. The instructions, when executed by the processing circuitry of the network device, further cause the processing circuitry of the network device to, in response to receiving an indication that a new network address is assigned to the second network interface, re-determine whether the tentative network address is duplicative of any one of the plurality of network addresses assigned to the plurality of other network interfaces associated with the plurality of other network devices in the network segment. The instructions, when executed by the processing circuitry of the network device, further cause the processing circuitry of the network device to, in response to determining that the tentative network address is not duplicative of any one of the plurality of network addresses assigned to the plurality of other network interfaces associated with the plurality of other network devices in the network segment, assign the tentative network address to the first network interface.

The details of one or more examples of the techniques described herein are set forth in the accompanying drawings and the description below. Other features, objects, and advantages of the techniques described herein will be apparent from the description and drawings, and from the claims.

DETAILED DESCRIPTION

Figure 1A:
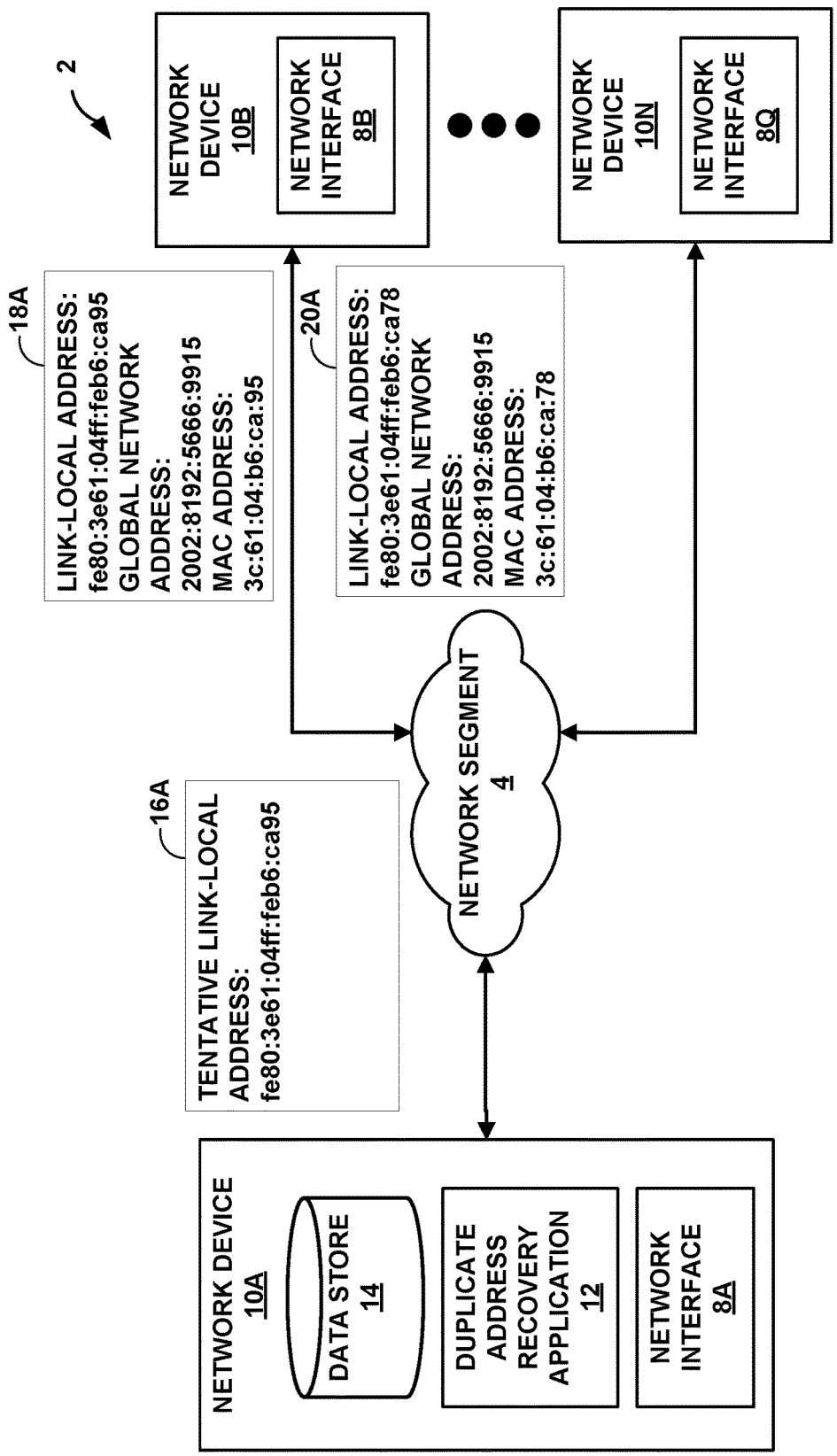
FIGS. 1A and 1B are block diagrams illustrating a network system in which a network device may recover from generating a duplicate network address in a network segment, in accordance with the techniques described in this disclosure.
Figure 1B:
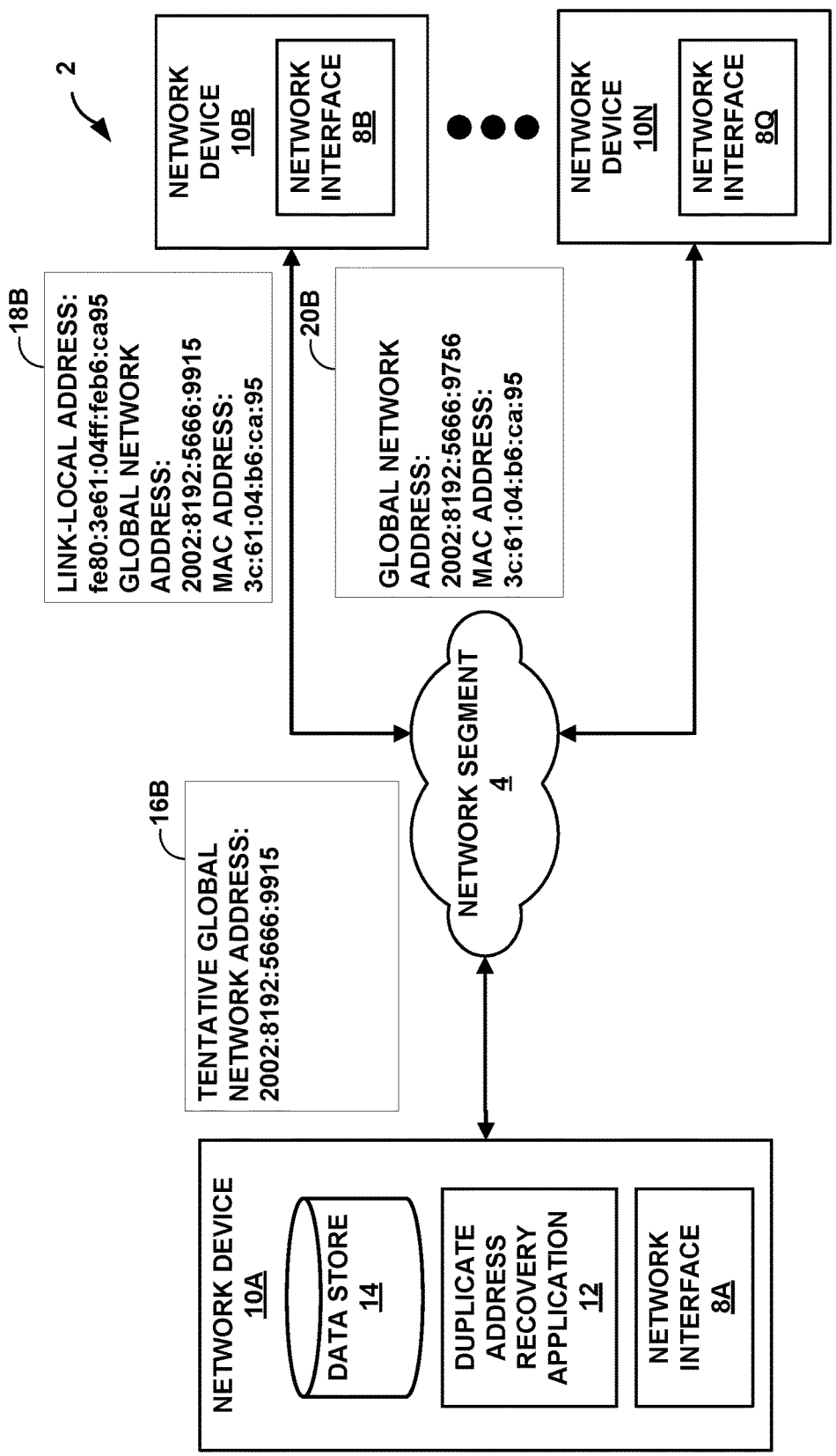

FIGS. 1A and 1B are block diagrams illustrating network system 2 in which a network device 10A may recover from generating a duplicate network address in network segment 4, in accordance with the techniques described in this disclosure. As shown in FIGS. 1A and 1B, network system 2 includes network segment 4, and network devices 10A-10N ("network devices 10"). Network devices 10 may include network interfaces 8A-8Q ("network interfaces 8") that are connected to network segment 4. Each of network devices 10 may include one or more of network interfaces 8.

Network segment 4 may be a portion of a computer network that is separated, such as by a bridge, router, or switch, from the rest of the computer network. Network segment 4 may comprise various devices and network links that facilitate communication among network devices 10 via network interfaces 8. For instance, network segment 4 may comprise one or more routers, hubs, repeaters, and/or switches. Examples of network segment 4 may include an Ethernet network, a wireless network, or other type of network.

Network interfaces 8 connected to network segment 4 may each be assigned a unique link-local address used for identifying each of network interfaces 8 within network segment 4. Network interfaces 8 may also each be assigned a unique global network address for identifying each of network interfaces 8 outside of network segment 4 within a computer network. For example, network segment 4 may be a local area network while the rest of the computer network may be a wide area network such as the Internet. In this example, network interfaces 8 may be connected to both network segment 4 and the Internet. Network interfaces 8 may be identified within network segment 4 by the link-local addresses assigned to network interfaces 8, and may be identified outside of network segment 4 and within the Internet by the global network addresses assigned to network interfaces 8.

Network device 10A may comprise various types of computing devices. For example, network device 10A may comprise a router, switch, server computer, blade server, a personal computer, a mobile computing device (e.g., a tablet computer, smartphone), or another type of network-equipped computing device. Network devices 10B-10N each may comprise similar types of network-equipped computing devices.

Network device 10A may also include network interface 8A. Network interface 8A may be any suitable hardware, software, or combination of software and hardware that connects network device 10A to network segment 4. In some examples, network interface 8A may be a physical interface, such as a network interface controller (NIC), which may be a computer hardware component that connects network device 10A to network segment 4. In other examples, network interface 8A may be the network interface of a virtual machine that executes on one or more processors of network device 10A. In the examples where network interface 8A is the network interface of a virtual machine, network interface 8A may communicate with a NIC of network device 10A to connect network device 10A to network segment 4. Although network device 10A is shown as including a single network interface 8A, network device 10A may include any number of network interfaces, and network interface 8A may be an example of one of any number of network interfaces in network device 10A. Network interfaces 8B-8Q each may comprise similar types of network interfaces.

Network device 10A may also include duplicate address recovery application 12. Duplicate address recovery application 12 may execute on processing circuitry of network device 10A, and may configure the processing circuitry to perform the example techniques described in this disclosure. For example, memory of network device 10A may store computer-readable instructions for duplicate address recovery application that the processing circuitry retrieves and executes. Execution of the instructions then configures the processing circuitry to perform the example operations described in this disclosure. In some examples, the processing circuitry may be a combination of fixed-function circuitry (e.g., having immutable operations) and programmable circuitry. For example, the processing circuitry may include one or more processors, and the processors will include programmable cores and fixed-function circuitry as one example.

Network device 10A may also include data store 14. Data store 14 may comprise any suitable computer-readable storage device for storing data that may be used by duplicate address recovery application 12 to perform the example techniques descried in this disclosure.

When a network device joins a network segment, the network device may autoconfigure the one or more network interfaces included in the network device to determine a link-local address for each of the one or more network interfaces included in the network device to uniquely identify each of the one or more network interfaces included in the network device within the network segment. The network device may also autoconfigure the one or more network interfaces included in the network device to determine a global network address for each of the one or more network interfaces to uniquely identify each of the one or more network interfaces within a network, where the network segment is a portion of the network. Examples of a global network address may include an Internet Protocol version 4 (IPv4) address, an Internet Protocol version 6 (IPv6) address, and the like. A network device may generate link-local addresses and global network addresses in one or more of a variety of ways. For example, a network device may automatically generate a link-local address and a global network address for a network interface. In another example, a network device may select both a MAC address, a global network address, and a link-local address for a network interface of a virtual machine that executes on the network device out of a pool of MAC address, a pool of global network addresses, and a pool of link-local addresses. In some examples, a network device may derive a link-local address for a network device based at least in part on the MAC address assigned to the network device.

As shown in FIG. 1A, network device 10A may autoconfigure its network interface 8A, including determining a link-local address for network interface 8A to uniquely identify network interface 8A within network segment 4. Network device 10A may determine the link-local address in any suitable manner, as discussed above. For example, network device 10A may derive, as the link-local address associated with network interface 8A, a link-local address in a 64-bit Extended Unique Identifier (EUI-64) format based at least in part on the MAC address of network interface 8A. In other examples, network device 10A may determine the link-local address for network interface 8A that is not based on the network interface 8A's MAC address.

Because the link-local address uniquely identifies a particular network interface in network segment 4, each of network interfaces 8 in network segment 4 must be associated with a unique link-local address that is different from any of the other link-local addresses associated with the other network interfaces in network interfaces 8 to avoid network traffic being sent to an incorrect destination. Thus, network device 10A may determine a tentative link-local address for network interface 8A, and duplicate address recovery application 12 may execute on network device 10A to determine whether the tentative link-local address is the same as any other of the link local addresses associated with another network interface 8 (i.e., one of network interfaces 8B-8Q) connected to network segment 4 before network device 10A assigns the tentative link-local address to network interface 8A.

In response to generating the tentative link-local address for network interface 8A, duplicate address recovery application 12 may determine whether the tentative link-local address is duplicative of any one of a plurality of link-local addresses assigned to a plurality of other network interfaces (i.e., one of network interfaces 8B-8Q) connected to network segment 4. For example, duplicate address recovery application 12 may perform duplicate address detection based on the techniques described in RFC 4862 (referenced above). As part of performing duplicate address detection, duplicate address recovery application 12 may send neighbor solicitation message 16A that includes an indication of the tentative link-local address generated by network device 10A to each of network devices 10B-10N connected to network segment 4. In the example of FIG. 1, neighbor solicitation message 16A includes an indication of the tentative link-local address "fe80::3e61:04ff:feb6:ca95" generated for network interface 8A.

Each of network devices 10B-10N may receive neighbor solicitation message 16A and may compare the tentative link-local address indicated by neighbor solicitation message 16A with the link-local addresses assigned to the respective network interfaces 8B-8Q in network devise 10B-10N. If a network device from network devices 10B-10N determines that the indicated tentative link-local address is the same as a link-local address that is already assigned to a network interface in the network device, the network device may, in response to the neighbor solicitation message, send a neighbor advertisement message to the network device that sent the neighbor solicitation message to indicate that the link-local address is already in use in network segment 4.

In the example of FIG. 1A, the tentative link-local address that network device 10A generates for network interface 8A may be the same as the link-local address that is already assigned to network interface 8B of network device 10B. Thus, in response to receiving the neighbor solicitation message 16A from network device 10A, network device 10B may send neighbor advertisement message 18A to network device 10A to indicate that the tentative link-local address generated by network device 10A is duplicative of the link-local address assigned to network interface 8B of network device 10A.

The neighbor advertisement message may include information that identifies the network interface (e.g., network interface 8B) that is already assigned to a link-local address in network segment 4 that is the same as the tentative link-local address generated by network device 10A. For example, the neighbor advertisement message 18A may include an indication of the link-local address associated with network interface 8B, an indication of the global network address associated with network interface 8B, the MAC address associated with network interface 8B, and the like. A global network address may be may be a network address that identifies network interface 8B on networks beyond network segment 4, such as an IPv6 address that identifies network interface 8B in a network such as the Internet. In the example of FIG. 1, neighbor advertisement message 18A may include an indication of the MAC address "fe80::3e61:04ff:feb6:ca95" assigned to network interface 8B, an indication of the global network address "2002:8192: 5666:9915" assigned to network interface 8B, and an indication of the link-local address "fe80:3e61:04ff:feb6:ca95" assigned to network interface 8B.

Because network device 10B sends neighbor advertisement message 18A in response to receiving neighbor solicitation message 16A from network device 10A, neighbor advertisement message 18A sent by network device 10B is a solicited neighbor advertisement message. This is in contrast to an unsolicited neighbor advertisement message that may be sent by one of network device 10 that is not in response to receiving a neighbor solicitation message.

Duplicate address recovery application 12 may determine whether the tentative link-local address that network device 10A generated for network interface 8A is duplicative of any one of a plurality of link-local addresses assigned to other network interfaces (i.e., network interfaces 8B-8Q) connected to network segment 4 based at least in part on whether it receives a solicited neighbor advertisement from one of the other network devices 10B-10N that is in response to the neighbor solicitation message sent by network device 10A. If network device 10A does not receive a solicited neighbor advertisement from one of the other network devices 10B-10N that is in response to the neighbor solicitation message sent by network device 10A, then duplicate address recovery application 12 may determine that the tentative link-local address is not duplicative of any one of the link-local addresses assigned to other network interfaces 8B-8Q connected to network segment 4. On the other hand, if network device 10A receives a solicited neighborhood advertisement message from one of network devices 10B-10N that is response to the neighbor solicitation message sent by network device 10A, duplicate address recovery application 12 may determine that the tentative link-local address is duplicative of a link-local address that is already assigned to one of the other network interfaces 8B-8Q connected to network segment 4.

In the example of FIG. 1, network device 10A may receive neighborhood advertisement message 18A that network device 10B sends in response to receiving neighborhood solicitation message 16A from network device 10A. In response to receiving neighbor advertisement message 18A from network device 10B, duplicate address recovery application 12 may determine that the tentative link-local address generated by network device 10A is duplicative of the link-local address that is already assigned to network interface 8B. As such, network device 10A is not able to assign the tentative generated link-local address to network interface 8A.

In accordance with aspects of this disclosure, duplicate address recovery application 12 may, in response to determining that the tentative link-local address generated by network device 10A for network interface 8A is duplicative of a link-local address assigned to another network interface in network segment 4, perform automatic recovery from the determination to associate network interface 8A with a valid link-local address that is not duplicative of any other link-local addresses assigned to network interfaces 8B-8Q in network segment 4. Duplicate address recovery application 12 may perform such automatic recovery to wait for changes in the link-local addresses assigned to other network interfaces 8B-8Q in network segment 4 without any manual intervention at network device 10A, such as by an administrator of network device 10A. By performing automatic recovery, duplicate address recovery application 12 may be able to resolve the situation where the tentative link-local address is duplicative of the link-local address assigned to network device 8B by associating network interface 8A with a valid link-local address that is not a duplicate of any other link-local addresses associated with other network interfaces 8B-8Q in network segment 4.

Duplicate address recovery application 12 may perform automatic recovery from the duplicate address determination based at least in part on tracking the network interface that is currently associated with the same link-local address as the tentative link-local address generated by network device 10A for network interface 8A. Because the solicited neighbor advertisement message received by network device 10A indicates that network interface 8B is the network interface that is currently associated with the same link-local address as the tentative link-local address generated by network device 10A for network interface 8A, duplicate address recovery application 12 may track network interface 8B to determine when network interface 8B is assigned to a new link-local address.

Because the new link-local address assigned to network interface 8B will be different from the link-local address that was previously assigned to network interface 8B, the tentative link-local address would no longer be duplicative of the link-local address assigned to network interface 8B when a new link-local address is assigned to network interface 8B. Therefore, when network interface 8B is assigned to a new link-local address, network device 10A may be able to assign the tentative link-local address to network interface 8A.

Duplicate address recovery application 12 may track network interface 8B to determine whether network interface 8B has been assigned to a new link-local address based at least in part on the information included in the neighbor advertisement message sent by network device 10B. In particular, network device 10A may store an indication of network interface 8B in data store 14, so that when network device 10A receives a message that indicates a new link-local address has been assigned to a network interface from network interfaces 8B-8Q, Duplicate address recovery application 12 may use the indication of network interface 8B to determine whether the message indicates that a new link-local address has been assigned to network interface 8B.

The indication of network interface 8B stored in data store 14 of network device 10A may include information included in the neighbor advertisement message sent by network device 10B that uniquely identifies network 8B, and that will not change even when network interface 8B associates itself with a new link-local address. As discussed above, the neighbor advertisement message sent by network device 10B may include an indication of the link-local address associated with network interface 8B, an indication of the global network address associated with network interface 8B, the MAC address associated with network interface 8B, and the like.

Because the link-local address associated with network interface 8B will change when network interface 8B is associated with a new link-local address, network device 10A cannot track network interface 8B by merely storing an indication of the link-local address assigned to network interface 8B. Further, if the link-local address associated with network interface 8B is generated based at least in part on the MAC address associated with network interface 8B, such as in the case when the link-local address associated with network interface 8B is in an EUI-64 format, then a change in the link local address of network interface 8B indicates that the MAC address assigned to network interface 8B has also changed. In this case, duplicate address recovery application 12 may not be able to track network interface 8B by storing an indication of the MAC address associated with network interface 8B because the MAC address associated with network interface 8B will change when the link-local address assigned to network interface 8B changes. Instead, to track network interface 8B, duplicate address recovery application 12 may store an indication of the global network address associated with network interface 8B in data store 14.

Storing an indication of a network interface in data store 14 may include storing an association between the indication of the network interface and the current link-local address of the network interface. In this way, duplicate address recovery application 12 may compare the new link-local address assigned to the tracked network interface with the link-local address of the tracked network interface stored in data store 14 to determine whether the new link-local address is different from the link-local address of the tracked network interface. In the example where data store 14 stores an indication of the global network address assigned to the tracked network interface, data store 14 may store an association between the current link-local address assigned to the tracked network interface and the global network address of the tracked network interface.

When the link-local address assigned to a network interface has changed, such as when a new link-local address is assigned to the network interface, the network device that includes the network interface may send an unsolicited neighbor advertisement message to network devices within a network segment to indicate that a new link-local address is assigned to the network interface. An unsolicited neighbor advertisement message, as discussed above, is a neighbor advertisement message that is not sent in response to a neighbor solicitation message.

Similar to a solicited neighbor advertisement message, an unsolicited neighbor advertisement message, an unsolicited neighbor advertisement message may include an indication of the network interface that has changed its associated link-local address. For example, when network device 10B assigns a new link-local address to network interface 8B, network device 10B may send unsolicited neighbor advertisement message 20A to network devices 10A and 10C-10N connected to network segment 4 that includes an indication of the new link-local address associated with network interface 8B, an indication of the global network address associated with network interface 8B, the MAC address associated with network interface 8B, and the like.

In the example of FIG. 1, unsolicited neighbor advertisement message 20A may include an indication of the MAC address "3c:61:04:b6:ca:78" assigned to network interface 8B, an indication of the global network address "2002:8192:5666:9915" assigned to network interface 8B, and an indication of the new link-local address "fe80:3e61:04ff:feb6:ca78" assigned to network interface 8B. While the global network address assigned to network interface 8B remains the same as before, the new link-local address assigned to network interface 8B is different from the link-local address "fe80:3e61:04ff:feb6:ca95" that was previously assigned to network interface 8B, and the new MAC address assigned to network interface 8B is also different from the MAC address that was previously assigned to network interface 8B.

When network device 10A receives unsolicited neighbor advertisement message 20B, duplicate address recovery application 12 may determine, based on the indications of network interfaces stored in data store 14, whether unsolicited neighbor advertisement message 20B is associated with a network interface being tracked by network device 10A, such as network interface 8B. If so, duplicate address recovery application 12 may determine whether unsolicited neighborhood advertisement message 20B indicates that a new link-local address is assigned to one of the network interfaces that is tracked by network device 10A.

If network device 10A stores indications of global network addresses assigned to network interfaces that are tracked by network device 10A in data store 14, duplicate address recovery application 12 may determine whether unsolicited neighbor advertisement message 20A is associated with network interface 8B being tracked by network device 10A by determining whether the global network address indicated by unsolicited neighborhood advertisement message 20A matches the global network address stored by network device 10 in data store 14 that is assigned to network interface 8B.

In response to determining that unsolicited neighbor advertisement message 20A is associated with a network interface, such as network interface 8B, being tracked by network device 10A, duplicate address recovery application 12 may determine whether unsolicited neighbor advertisement message 20A indicates that a new link-local address is assigned to network interface 8B. Duplicate address recovery application 12 may compare the MAC address indicated in unsolicited neighbor advertisement message 20A with the MAC address assigned to network interface 8B as stored in data store 14. If the MAC address indicated in unsolicited neighbor advertisement message 20A is different from the link-local address assigned to network interface 8B as stored in data store 14, duplicate address recovery application 12 may determine that network interface 8B is assigned to a new link-local address In response to determining that network interface 8B is assigned to a new link-local address, duplicate address recovery application 12 may re-determine whether the tentative link-local address generated for network interface 8A is duplicative of any one of the plurality of link-local addresses assigned to network interfaces 8B-8Q in network segment 4. For example, network device 10A may re-send, to the other network devices 10B-10N in network segment 4, neighbor solicitation message 16A that includes an indication of the tentative link-local address. In response to not receiving a neighbor advertisement message from any of the other network devices 10B-10N that is in response to neighbor solicitation message 16A, duplicate address recovery application 12 may determine that the tentative link-local address generated for network interface 8A is not duplicative of any one of the plurality of link-local addresses assigned to network interfaces 8B-8Q in network segment 4.

In response to determining that the tentative link-local address is not duplicative of any one of the plurality of link-local addresses assigned to network interfaces 8B-8Q in network segment 4, network device 10A may assign the tentative link-local address to network interface 8B, so that the tentative link-local address is the link-local address assigned to network interface 8B. In this way, network device 10A may perform automatic recovery from generating a duplicate link-local address.

The techniques disclosed herein may also be performed to determine whether a tentative global network address assigned to a network interface is duplicative of a global network address that is already assigned to a network interface. As shown in FIG. 1B, network device 10A may autoconfigure its network interface 8A, including determining a tentative network address for network interface 8A. Determining a tentative network address for network interface 8A may include determining a global network address for network interface 8A to uniquely identify network interface 8A within a network. Network device 10A may determine the global network address in any suitable manner, Because the global network address uniquely identifies a particular network interface in a network that includes network segment 4, each of network interfaces 8 in the network must be associated with a unique global network address that is different from any of the other global network addresses associated with the other network interfaces in network interfaces 8 to avoid network traffic being sent to an incorrect destination. Thus, network device 10A may determine a tentative global network address for network interface 8A, and duplicate address recovery application 12 may execute on network device 10A to determine whether the tentative global network address is the same as any other of the global network addresses associated with another network interface 8 (i.e., one of network interfaces 8B-8Q) connected to network segment 4 before network device 10A assigns the tentative global network address to network interface 8A.

In response to generating the tentative global network address for network interface 8A, duplicate address recovery application 12 may determine whether the tentative global network address is duplicative of any one of a plurality of global network addresses assigned to a plurality of other network interfaces (i.e., one of network interfaces 8B-8Q) connected to network segment 4. For example, duplicate address recovery application 12 may perform duplicate address detection. As part of performing duplicate address detection, duplicate address recovery application 12 may send neighbor solicitation message 16B that includes an indication of the tentative global network address generated by network device 10A to each of network devices 10B-10N connected to network segment 4. In the example of FIG. 1B, neighbor solicitation message 16B includes an indication of the tentative global network address "2002:8192:5666:9915" generated for network interface 8A.

Each of network devices 10B-10N may receive neighbor solicitation message 16B and may compare the tentative global network address indicated by neighbor solicitation message 16B with the global network addresses assigned to the respective network interfaces 8B-8Q in network device 10B-10N. If a network device from network devices 10B-10N determines that the indicated tentative global network address is the same as a global network address that is already assigned to a network interface in the network device, the network device may, in response to the neighbor solicitation message, send a neighbor advertisement message to the network device that sent the neighbor solicitation message to indicate that the global network address is already assigned to another network interface in network segment 4.

In the example of FIG. 1, the tentative global network address that network device 10A generates for network interface 8A may be the same as the global network address that is already assigned to network interface 8B of network device 10B. Thus, in response to receiving the neighbor solicitation message 16B from network device 10A, network device 10B may send neighbor advertisement message 18B to network device 10A to indicate that the tentative global network address generated by network device 10A is duplicative of the global network address assigned to network interface 8B of network device 10A.

The neighbor advertisement message may include information that identifies the network interface (e.g., network interface 8B) that is already assigned to a global network address in network segment 4 that is the same as the tentative global network address generated by network device 10A. For example, the neighbor advertisement message may include an indication of the link-local address associated with network interface 8B, an indication of the global network address associated with network interface 8B, the MAC address associated with network interface 8B, and the like. In the example of FIG. 1B, neighbor advertisement message 18B may include an indication of the MAC address "3c:61:04:b6:ca:95" assigned to network interface 8B, an indication of the global network address "2002:8192:5666:9915" assigned to network interface 8B, and an indication of the link-local address "fe80:3e61:04ff:feb6:ca95" assigned to network interface 8B.

Because network device 10B sends neighbor advertisement message 18B in response to receiving neighbor solicitation message 16B from network device 10A, neighbor advertisement message 18B sent by network device 10B is a solicited neighbor advertisement message. This is in contrast to an unsolicited neighbor advertisement message that may be sent by one of network device 10 that is not in response to receiving a neighbor solicitation message.

Duplicate address recovery application 12 may determine whether the tentative global network address that network device 10A generated for network interface 8A is duplicative of any one of a plurality of global network addresses assigned to other network interfaces (i.e., network interfaces 8B-8Q) connected to network segment 4 based at least in part on whether it receives a solicited neighbor advertisement from one of the other network devices 10B-10N that is in response to the neighbor solicitation message sent by network device 10A. If network device 10A does not receive a solicited neighbor advertisement from one of the other network devices 10B-10N that is in response to the neighbor solicitation message sent by network device 10A, then duplicate address recovery application 12 may determine that the tentative global network address is not duplicative of any one of the global network addresses assigned to other network interfaces 8B-8Q connected to network segment 4. On the other hand, if network device 10A receives a solicited neighborhood advertisement message from one of network devices 10B-10N that is response to the neighbor solicitation message sent by network device 10A, duplicate address recovery application 12 may determine that the tentative global network address is duplicative of global network address that is already assigned to one of the other network interfaces 8B-8Q connected to network segment 4.

In the example of FIG. 1B, network device 10A may receive neighborhood advertisement message 18B that network device 10B sends in response to receiving neighborhood solicitation message 16B from network device 10A. In response to receiving neighbor advertisement message 18B from network device 10B, duplicate address recovery application 12 may determine that the tentative global network address generated by network device 10A is duplicative of the global network address that is already assigned to network interface 8B. As such, network device 10A is not able to assign the tentative global network address to network interface 8A.

In accordance with aspects of this disclosure, duplicate address recovery application 12 may, in response to determining that the tentative global network address generated by network device 10A for network interface 8A is duplicative of a global network address assigned to another network interface in network segment 4, perform automatic recovery from the determination to associate network interface 8A with a valid global network address that is not duplicative of any other global network addresses assigned to network interfaces 8B-8Q in network segment 4. Duplicate address recovery application 12 may perform such automatic recovery to wait for changes in the global network addresses assigned to other network interfaces 8B-8Q in network segment 4 without any manual intervention at network device 10A, such as by an administrator of network device 10A. By performing automatic recovery, duplicate address recovery application 12 may be able to resolve the situation where the tentative global network address is duplicative of the link-local address assigned to network device 8B by associating network interface 8A with a valid global network address that is not a duplicate of any other global network addresses associated with other network interfaces 8B-8Q in network segment 4.

Duplicate address recovery application 12 may perform automatic recovery from the duplicate address determination based at least in part on tracking the network interface that is currently associated with the same global network address as the tentative global network address generated by network device 10A for network interface 8A. Because the solicited neighbor advertisement message received by network device 10A indicates that network interface 8B is the network interface that is currently associated with the same global network address as the tentative global network address generated by network device 10A for network interface 8A, duplicate address recovery application 12 may track network interface 8B to determine when network interface 8B is assigned to a new global network address.

Because the new global network address assigned to network interface 8B will be different from the global network address that was previously assigned to network interface 8B, the tentative global network address would no longer be duplicative of the global network address assigned to network interface 8B when a new link-local address is assigned to network interface 8B. Therefore, when network interface 8B is assigned to a new global network address, network device 10A may be able to assign the tentative global network address to network interface 8A.

Duplicate address recovery application 12 may track network interface 8B to determine whether network interface 8B has been assigned to a new global network address based at least in part on the information included in the neighbor advertisement message sent by network device 10B. In particular, network device 10A may store an indication of network interface 8B in data store 14, so that when network device 10A receives a message that indicates a new global network address has been assigned to a network interface from network interfaces 8B-8Q, Duplicate address recovery application 12 may use the indication of network interface 8B to determine whether the message indicates that a new global network address has been assigned to network interface 8B.

The indication of network interface 8B stored in data store 14 of network device 10A may include information included in the neighbor advertisement message sent by network device 10B that uniquely identifies network 8B, and that will not change even when network interface 8B associates itself with a new global network address. As discussed above, the neighbor advertisement message sent by network device 10B may include an indication of the link-local address associated with network interface 8B, an indication of the global network address associated with network interface 8B, the MAC address associated with network interface 8B, and the like.

Because the global network address associated with network interface 8B will change when network interface 8B is associated with a new global network address, network device 10A cannot track network interface 8B by merely storing an indication of the global network address assigned to network interface 8B. Instead, network device 10A may instead store an indication of the MAC address assigned to network interface 8B, because the MAC address assigned to network interface 8B may not necessarily change when a new global network address is assigned to network interface 8B.

Duplicate address recovery application 12 may track network interface 8B by storing an indication of the MAC address associated with network interface 8B in data store 14. Storing an indication of a network interface in data store 14 may include storing an association between the indication of the network interface and the current global network address of the network interface. In this way, duplicate address recovery application 12 may compare the new global network address assigned to the tracked network interface with the global network address of the tracked network interface stored in data store 14 to determine whether the new global network address is different from the global network address of the tracked network interface. In the example where data store 14 stores an indication of the MAC address assigned to the tracked network interface, data store 14 may store an association between the MAC address assigned to the tracked network interface and the global network address of the tracked network interface. In the example where data store 14 stores an indication of the global network address assigned to the tracked network interface, data store 14 may store an association between the MAC address assigned to the tracked network interface and the global network address of the tracked network interface.

When the global network address assigned to a network interface has changed, such as when a new global network address is assigned to the network interface, the network device that includes the network interface may send an unsolicited neighbor advertisement message to network devices within a network segment to indicate that a new global network address is assigned to the network interface.

An unsolicited neighbor advertisement message, as discussed above, is a neighbor advertisement message that is not sent in response to a neighbor solicitation message.

Similar to a solicited neighbor advertisement message, an unsolicited neighbor advertisement message, an unsolicited neighbor advertisement message may include an indication of the network interface that has changed its associated global network address. For example, when network device 10B assigns a new global network address to network interface 8B, network device 10B may send unsolicited neighbor advertisement message 20B to network devices 10A and 10C-10N connected to network segment 4 that includes an indication of the new global network address associated with network interface 8B, the MAC address associated with network interface 8B, and the like.

In the example of FIG. 1B, unsolicited neighbor advertisement message 20B may include an indication of the MAC address "3c:61:04:b6:ca:95" assigned to network interface 8B and an indication of the new global network address "2002:8192:5666:9756" assigned to network interface 8B. While the MAC address assigned to network interface 8B remains the same as before, the new global network address assigned to network interface 8B is different from the global network address "2002:8192:5666:9915" that was previously assigned to network interface 8B.

When network device 10A receives unsolicited neighbor advertisement message 20B, duplicate address recovery application 12 may determine, based on the indications of network interfaces stored in data store 14, whether unsolicited neighbor advertisement message 20B is associated with a network interface being tracked by network device 10A, such as network interface 8B. If so, duplicate address recovery application 12 may determine whether unsolicited neighborhood advertisement message 20B indicates that a new global network address is assigned to one of the network interfaces that is tracked by network device 10A.

Duplicate address recovery application 12 may determine whether unsolicited neighbor advertisement message 20B is associated with, for example, network interface 8B tracked by network device 10A by determining whether the MAC address indicated by unsolicited neighborhood advertisement message 20B matches the MAC address stored in data store 14 that is assigned to network interface 8B. In response to determining that unsolicited neighbor advertisement message 20B is associated with a network interface, such as network interface 8B, being tracked by network device 10A, duplicate address recovery application 12 may determine whether unsolicited neighbor advertisement message 20B indicates that a new global network address is assigned to network interface 8B. Duplicate address recovery application 12 may compare the global network address indicated in unsolicited neighbor advertisement message 20B with the global network address assigned to network interface 8B as stored in data store 14. If the global network address indicated in unsolicited neighbor advertisement message 20B is different from the global network address assigned to network interface 8B as stored in data store 14, duplicate address recovery application 12 may determine that network interface 8B is assigned to a new global network address In response to determining that network interface 8B is assigned to a new global network address, duplicate address recovery application 12 may re-determine whether the tentative global network address generated for network interface 8A is duplicative of any one of the plurality of global network addresses assigned to network interfaces 8B-8Q in network segment 4. For example, network device 10A may re-send, to the other network devices 10B-10N in network segment 4, neighbor solicitation message 16B that includes an indication of the tentative global network address. In response to not receiving a neighbor advertisement message from any of the other network devices 10B-10N that is in response to neighbor solicitation message 16B, duplicate address recovery application 12 may determine that the tentative global network address generated for network interface 8A is not duplicative of any one of the plurality of global network addresses assigned to network interfaces 8B-8Q in network segment 4.

In response to determining that the tentative global network address is not duplicative of any one of the plurality of global network addresses assigned to network interfaces 8B-8Q in network segment 4, network device 10A may assign the tentative global network address to network interface 8B, so that the tentative global network address is the global network address assigned to network interface 8B. In this way, network device 10A may perform automatic recovery from generating a duplicate global network address.

Figure 2:
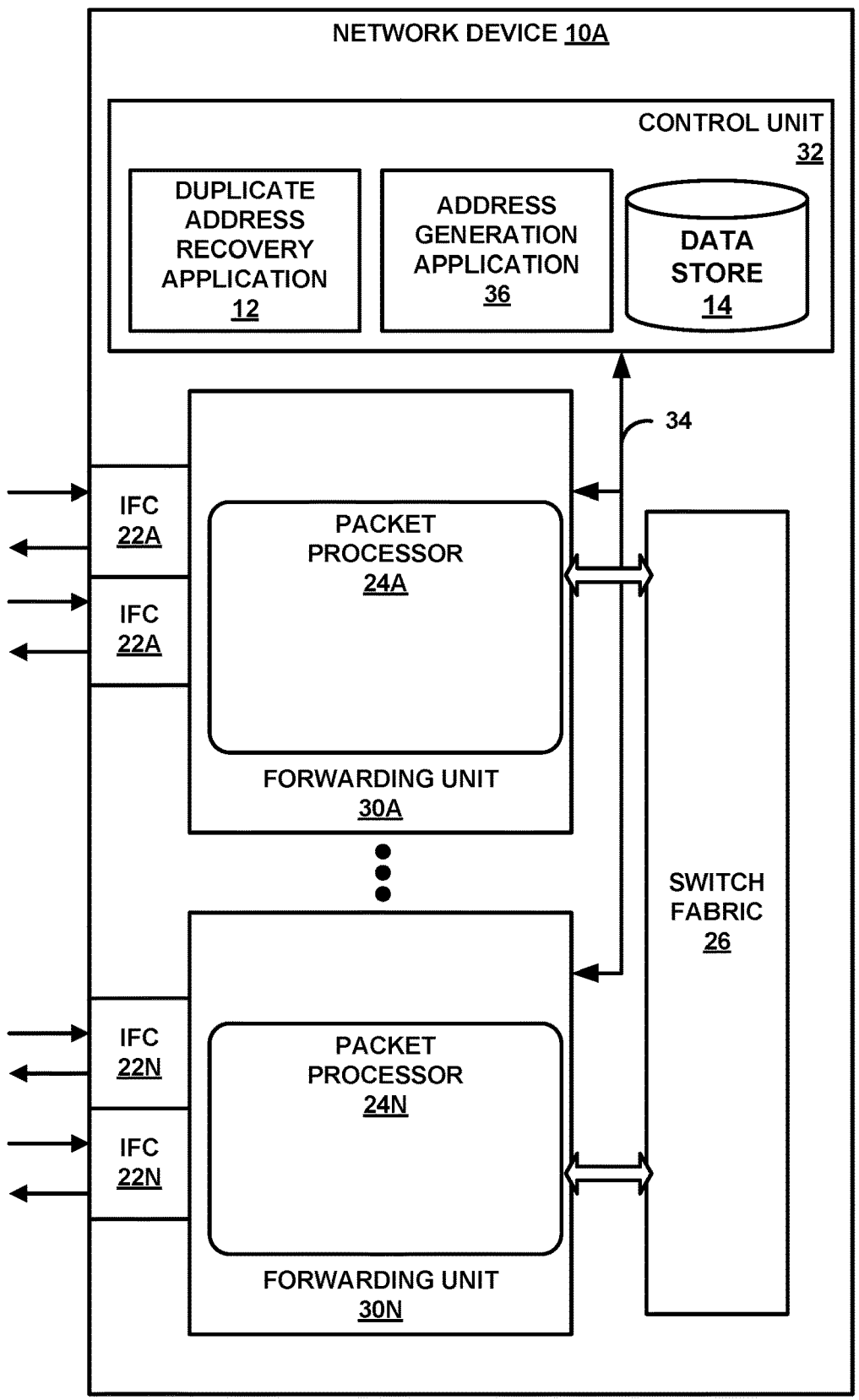
FIG. 2 is a block diagram illustrating an example network device that is configured to resolve instances when a tentative network address determined by the network device is duplicative of another network address in a network segment, according to techniques described herein.

FIG. 2 is a block diagram illustrating an example network device that is configured to resolve instances when a tentative network address determined by the network device is duplicative of another network address in a network segment, according to techniques described herein. As shown in FIG. 2, network device 10A may include a router such as a provider edge or customer edge router, a core router, or another type of network device, such as a switch. Network device 10A may include a control unit 32 that provides control plane functionality for the device. Network device 10A may also include a plurality of forwarding units 30A-30N ("forwarding units 30") and a switch fabric 26 that together provide a data plane for processing network traffic.

Forwarding units 30 receive and send data packets via interfaces of interface cards 22A-22N ("IFCs 22") each associated with a respective one of forwarding units 30. IFCs 22 may be examples of network interfaces 8 shown in FIG. 1, such that one or more of IFCs 22 may comprise network interface 8A shown in FIG. 1. Each of forwarding units 30 and its associated ones of IFCs 22 may represent a separate line card insertable within a chassis (not shown) of network device 10. IFCs 22 may be referred to throughout this disclosure as one or more network interfaces. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 30 may include more or fewer IFCs. Switch fabric 26 provides a high-speed interconnect among forwarding units 30 for forwarding incoming data packets to an egress forwarding unit of forwarding units 30 for output over a network, such as network segment 4 shown in FIG. 1, that includes network device 10A.

Control unit 32 is connected to each of forwarding units 30 by internal communication links 34. Internal communication links 34 may include a 100 Mbps Ethernet connection, for instance. Control unit 32 configures, by sending instructions and other configuration data via internal communication link 34, forwarding units 30 to define control processing operations applied to packets received by forwarding units 30.

Control unit 32 executes a plurality of applications. Each of the applications may represent a separate process managed by a control unit operating system. One or more of the applications executed by control unit 32 may run network management software, execute routing protocols to communicate with peer routing devices, maintain and update one or more routing tables, and create one or more forwarding tables for installation to forwarding units 30, among other functions.

Control unit may include duplicate address recovery application 12, address generation application 36, and data store 14. Control unit 32 may execute address generation application 36 to generate tentative link-local addresses for network interfaces of network device 10A, such as network interface 8A shown in FIGS. 1A and 1B. Control unit 32 may execute duplicate address recovery application 12 to perform the techniques described in FIGS. 1A and 1B to determine whether a tentative link-local address is duplicative of any one of a plurality of link-local addresses assigned to a plurality of other network interfaces connected to a network segment, such as network segment 4, and to resolve instances where recovery application 12 determines that the tentative link-local address is duplicative of another link-local address that is assigned to another network interface connected to the network segment.

Duplicate address recovery application 12 may send neighbor solicitation message 16A that indicates the tentative link-local address generated by address generation application 36. Duplicate address recovery application 12 may receive a neighbor advertisement message 18A from another network device (e.g., network device 10B) that indicates another network interface (e.g., network interface 8B) connected to network segment 4 is already assigned to the same link-local address as the tentative link-local address. In response to receiving neighborhood advertisement message 18A, duplicate address recovery application 12 may store an indication of network interface 8B in data store 14. For example, duplicate address recovery application 12 may store an association of the global network address of network interface 8B and the link-local address of network interface 8B in data store 14.

Subsequently, duplicate address recovery application 12 may receive an unsolicited neighbor advertisement message 20A from a neighboring network interface, which is one of the other network interfaces 8B-8N connected to the same network segment 4 as network device 10A. Duplicate address recovery application 12 may use the indication of network interface 8B stored in data store 14 to determine whether the unsolicited neighbor advertisement message is sent from network interface 8B and, if so, determine whether the unsolicited neighbor advertisement message 20A indicates that a new link-local address is assigned to network interface 8B.

In response to determining that a new link-local address is assigned to network interface 8B, duplicate address recovery application 12 may determine that the tentative link-local address generated by address generation application 12 is no longer duplicative of the link-local address that is currently assigned to network interface 8B, and duplicate address recovery application 12 may re-determine whether the tentative link-local address is duplicative of any of the link-local addresses assigned to any other network interfaces of network devices that are connected to network segment 4.

Similarly, duplicate address recovery application 12 may send neighbor solicitation message 16B that indicates the tentative global network address generated by address generation application 36. Duplicate address recovery application 12 may receive a neighbor advertisement message 18B from another network device (e.g., network device 10B) that indicates another network interface (e.g., network interface 8B) connected to network segment 4 is already assigned to the same global network address as the tentative global network address. In response to receiving neighborhood advertisement message 18B, duplicate address recovery application 12 may store an indication of network interface 8B in data store 14. For example, duplicate address recovery application 12 may store an association of the MAC address of network interface 8B and the global network address of network interface 8B in data store 14.

Subsequently, duplicate address recovery application 12 may receive an unsolicited neighbor advertisement message 20B from a neighboring network interface, which is one of the other network interfaces 8B-8N connected to the same network segment 4 as network device 10A. Duplicate address recovery application 12 may use the indication of network interface 8B stored in data store 14 to determine whether the unsolicited neighbor advertisement message is sent from network interface 8B and, if so, determine whether the unsolicited neighbor advertisement message indicates that a new global network address is assigned to network interface 8B.

In response to determining that a new global network address is assigned to network interface 8B, duplicate address recovery application 12 may determine that the tentative global network address generated by address generation application 12 is no longer duplicative of the link-local address that is currently assigned to network interface 8B, and duplicate address recovery application 12 may re-determine whether the tentative global network address is duplicative of any of the link-local addresses assigned to any other network interfaces of network devices that are connected to network segment 4.

In some examples, applications 12 and 36 may be daemons, which may represent user-level processes that are developed and deployed by the manufacturer of the network device 10A. In these examples, applications 12 and 36 are "native" to the network device 10A in that the development of the applications 12 and 36 is carefully managed by the manufacturer to facilitate secure, robust, and predictable operation of the network device 10A, such operation defined at least in part according to a configuration specified by an operator (e.g., a service provider, enterprise, or other customer of the network device 10A manufacturer)

Control unit 32 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 32 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 30 includes at least one packet processor 24 that processes packets by performing a series of operations on each packet over respective internal packet forwarding paths as the packets traverse the internal architecture of network device 10. Packet processor 24A of forwarding unit 40A, for instance, includes one or more configurable hardware chips (e.g., a chipset) that, when configured by applications executing on control unit 32, define the operations to be performed by packets received by forwarding unit 30. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 30 may include one or more packet processors 24.

In some examples, forwarding units 30, rather than control unit 32, may include duplicate address recovery application 12, address generation application 36, and data store 14. Forwarding units 30 may execute duplicate address recovery application 12 and address generation application 36 to perform the techniques described throughout this disclosure.

Operations may be performed, for example, on each packet by any of a corresponding ingress interface, an ingress forwarding unit 30, an egress forwarding unit 30, an egress interface or other components of network device 10A to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. The result of packet processing determines the manner in which a packet is forwarded or otherwise processed by packet processors 24 of forwarding units 30 from its input interface on one of IFCs 22 to, at least in some cases, its output interface on one of IFCs 22.

Figure 3A:
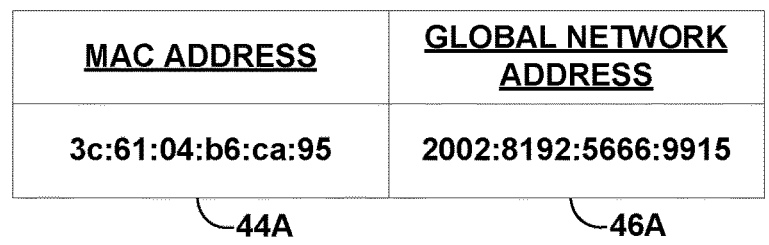
FIGS. 3A and 3B illustrate example data structures for tracking network interfaces in accordance with the techniques described in this disclosure.
Figure 3B:
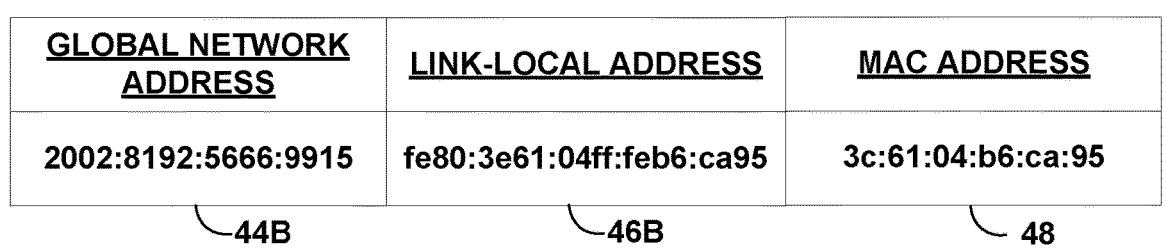

FIGS. 3A and 3B illustrate example data structures for tracking network interfaces in accordance with the techniques described in this disclosure. The example data structures shown in FIGS. 3A and 3B may be stored in data store 14 illustrated in FIGS. 1A and 1B and FIG. 2. The example data structures shown in FIGS. 3A and 3B may be implemented as any suitable data structure, such as database records, arrays, linked lists, hash tables, data files, spreadsheets, and the like.

As shown in FIG. 3A, network device 10A may use data structure 40A to track a network interface, such as network interface 8B, having an assigned global network address that is the same as the tentative global network address generated by network device 10A for network interface 8A. Data structure 40A may include MAC address data field 44A, and global network address data field 46A. MAC address data field 44A may store an indication of the MAC address assigned to the network interface tracked by network device 10A, and global network address data field 46A may store an indication of the global network address assigned to the network interface tracked by network device 10A. For example, MAC address data field 44A may store an indication of the MAC address assigned to network interface 8B that is tracked by network device 10A, and global network address data field 46A may store an indication of the global network address assigned to network interface 8B that is tracked by network device 10A. In this way, data structure 40A represents an association of the MAC address assigned to network interface 8B and the global network address assigned to network interface 8B, and network device 10A stores the association of the MAC address assigned to network interface 8B and the global network address assigned to network interface 8B as data structure 40A in data store 14.

As shown in FIG. 3B, network device 10A may use data structure 40B to track a network interface, such as network interface 8B, having an assigned link-local address that is the same as the tentative link-local address generated by network device 10A for network interface 8A. Network device 10A may use data structure 40B in situations where link-local addresses assigned to network interfaces 8 in network segment 4 are generated from MAC addresses assigned to network interfaces 8, such as when the link-local addresses are in an EUI-64 format.

Data structure 40B may include global network address data field 44B, link-local address data field 46B, and MAC address data field 48. Global network address data field 44B may store an indication of the global network address assigned to the network interface tracked by network device 10A, and link-local address data field 46B may store an indication of the link-local address assigned to the network interface tracked by network device 10A. MAC address data field 48 may store an indication of the MAC address assigned to the network interface tracked by network device 10A. For example, global network address data field 44B may store an indication of the global network address assigned to network interface 8B that is tracked by network device 10A, link-local address data field 46B may store an indication of the link-local address assigned to network interface 8B that is tracked by network device 10A, and MAC address data field 48 may store an indication of the MAC address assigned to network interface 8B that is tracked by network device 10A. In this way, data structure 40B represents an association of the global network address assigned to network interface 8B, the link-local address assigned to network interface 8B, and the MAC address assigned to network interface 8B, and network device 10A stores the association of the global network address assigned to network interface 8B, the link-local address assigned to network interface 8B, and the MAC address assigned to network interface 8B as data structure 40B in data store 14.

Figure 4A:
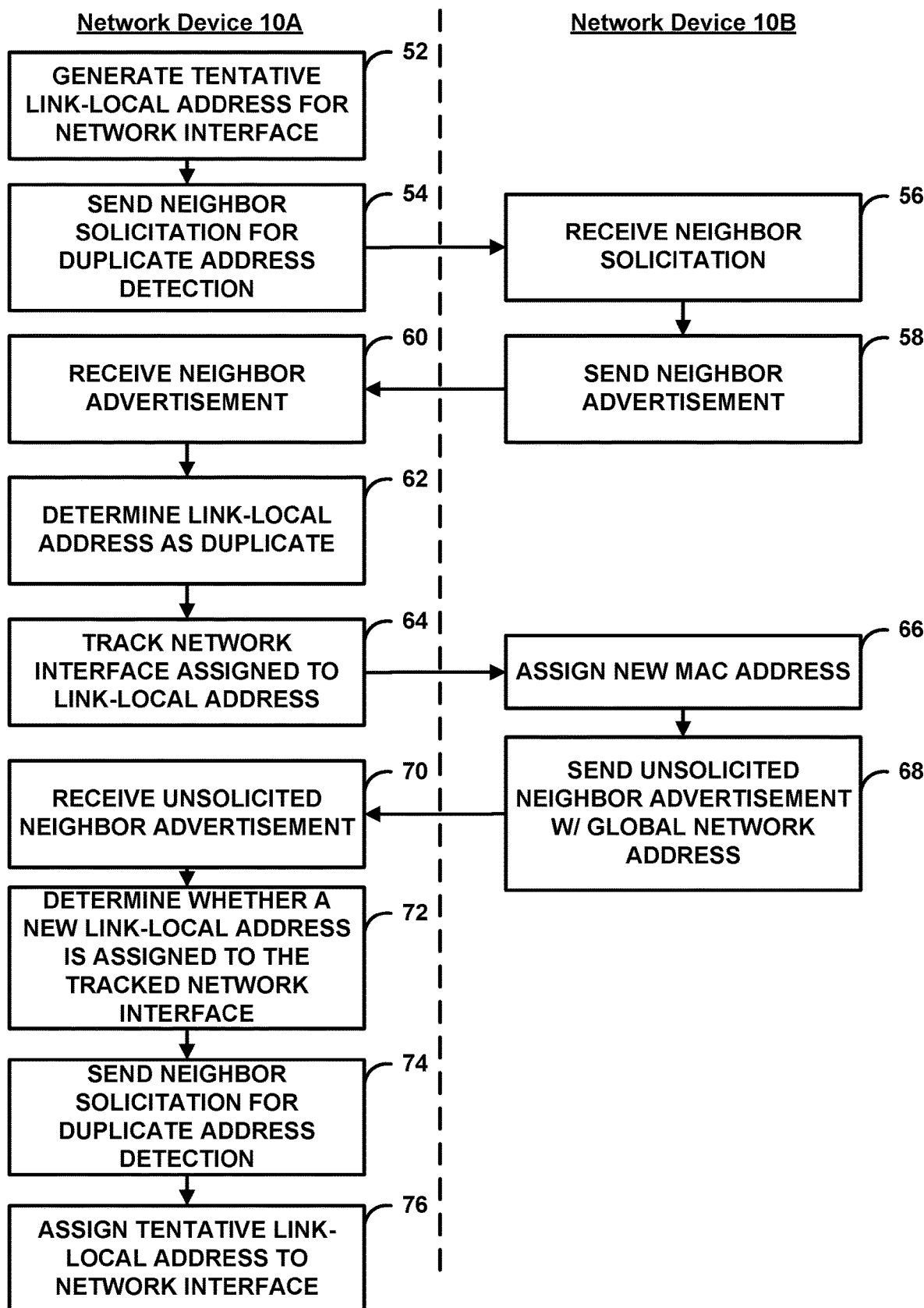
FIGS. 4A and 4B are flowcharts illustrating an example process for performing automatic recovery from generating a duplicate network address in accordance with the techniques described in this disclosure.
Figure 4B:
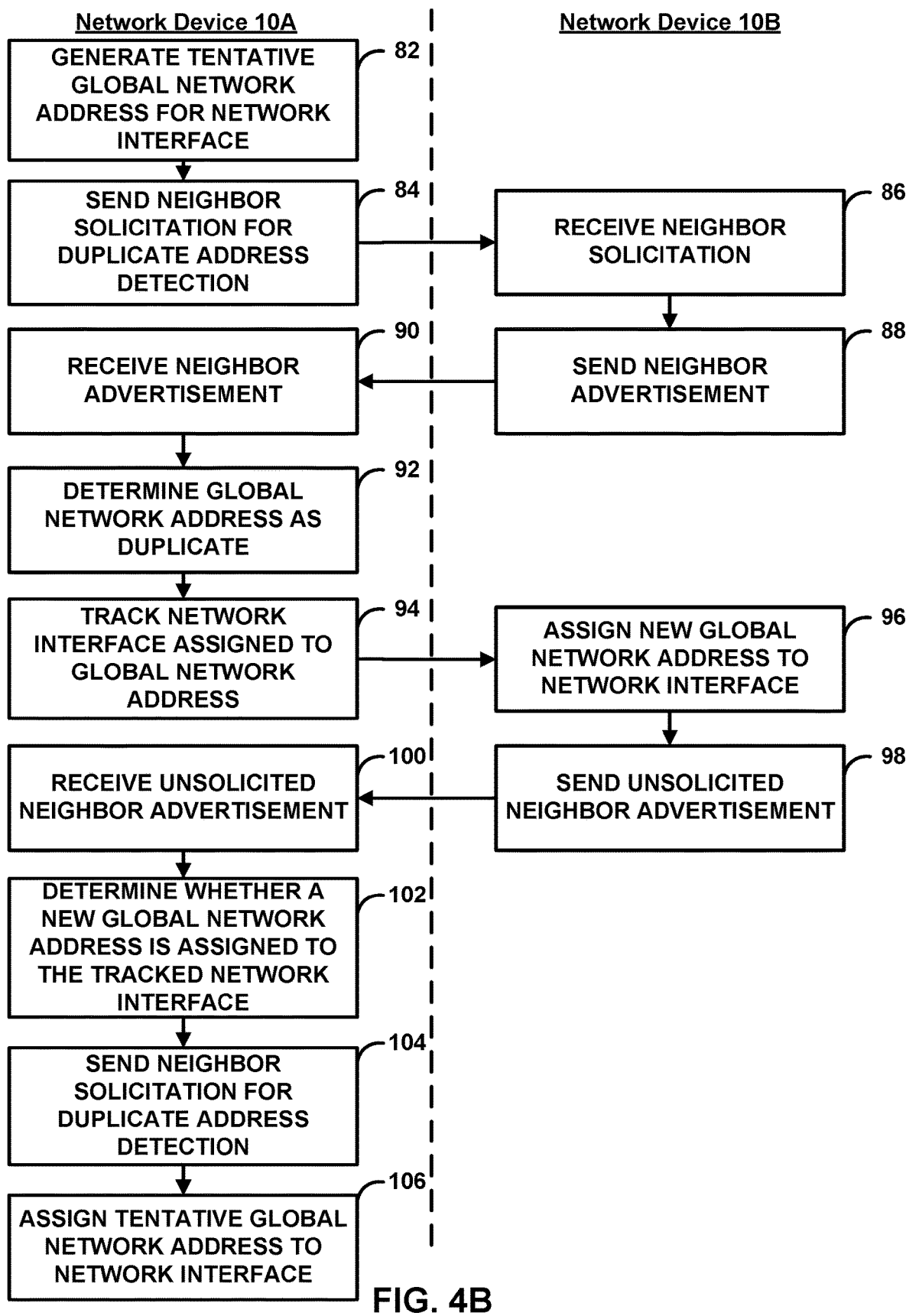

FIGS. 4A and 4B are flowcharts illustrating an example process for performing automatic recovery from generating a duplicate global network address in accordance with the techniques described in this disclosure. FIGS. 4A and 4B are illustrated with respect to network system 2 of FIG. 1A and network devices 10A and 10B of FIGS. 1A and 1B and FIG. 2. The techniques illustrated in FIGS. 4A and 4B as being performed by network device 10A may be performed by, for example, duplicate address recovery application 12 that executes at network device 10A. As shown in FIG. 4A, network device 10A may generate a tentative link local address for network interface 8A (52) and may perform duplicate address detection (DAD) by sending a neighbor solicitation message, such as neighbor solicitation message 16A shown in FIG. 1A, that includes an indication of the generated tentative link-local address to other network devices 10B-10N in network segment 4 (54).

Network device 10B may receive the neighborhood solicitation message (56) and may, in response to receiving neighbor solicitation message 16A and further in response to determining that the tentative link-local address indicated in neighborhood solicitation message 16A is a duplicate of the link-local address assigned to network interface 8B, send a neighbor advertisement message, such as neighbor advertisement message 18A, to network device 10A, to indicate that the tentative link-local address indicated in neighborhood solicitation message 16A is a duplicate of the link-local address assigned to network interface 8B (58).

Network device 10A may receive neighborhood advertisement message 18A from network device 10B (60) and may, in response, determine that the tentative link-local address generated for network interface 8A is a duplicate of the link-local address assigned network interface 8B (62). Determining that the tentative link-local address generated for network interface 8A is a duplicate of the link-local address assigned to network interface 8B may include determining that the MAC address of network interface 8A is also a duplicate of the MAC address of network interface 8B. In response to determining that the tentative link-local address generated for network interface 8A is a duplicate of the link-local address assigned network interface 8B, network device 10A may track network interface 8B (64). Network device 10A may track network interface 8B by storing an association of the link-local address assigned to network interface 8B with the global network address assigned to network interface 8B, such as in data structure 40B shown in FIG. 3B.

After sending neighbor advertisement message 18A indicating that the link-local address indicated in the neighborhood solicitation message is a duplicate of the link-local address associated with network interface 8B, network device 10B may, at a later point in time, assign a new MAC address to network interface 8B (66). Because network device 10B determines the link-local address assigned to network interface 8B based on the MAC address assigned to network interface 8B, assigning a new MAC address to network interface 8B includes assigning a new link-local address to network interface 8B. In response to a new link-local address being assigned to network interface 8B, network device 10B may send an unsolicited neighbor advertisement message, such as unsolicited neighbor advertisement message 20A, to other network devices in network segment 4 (68). The Unsolicited neighbor advertisement message may include an indication of the global network address assigned to network interface 8B and the MAC address assigned to network interface 8B.

Network device 10A may receive unsolicited neighbor advertisement message 20A from network device 10B (70) and may determine, based on unsolicited neighbor advertisement message 20, whether a new link-local address is assigned to network interface 8B tracked by network device 10A (72). Determining whether a new link-local address is assigned to network interface 8B tracked by network device 10A includes determining whether unsolicited neighbor advertisement message 20A pertains to a network interface that network device 10A is tracking, such as network interface 8B and, if so, whether unsolicited neighbor advertisement message 20A indicates that a new link-local address is assigned to network interface 8B tracked by network device 10.

Network device 10A may determine whether unsolicited neighbor advertisement message 20A pertains to a network interface that network device 10A is tracking, such as network interface 8B based on the information stored in unsolicited neighbor advertisement message 20A. For example, network device 10A may determine whether the global network address indicated by unsolicited neighbor advertisement message 20A matches the global network address assigned to network interface 8B as stored in network device 10A. If the global network address indicated by unsolicited neighbor advertisement message 20A matches the global network address assigned to network interface 8B as stored in network device 10A, determine that unsolicited neighbor advertisement message 20A pertains to network interface 8B being tracked by network device 10A.

In response to determining that the message pertains to network interface 8B being tracked by network device 10A, network device 10A may determine whether the message indicates a new link-local address has been assigned to network interface 8B. Network device may compare the MAC address indicated in unsolicited neighbor advertisement message 20A with the MAC address assigned to network interface 8B, as stored in network device 10A. If there is not a match between the MAC address indicated in unsolicited neighbor advertisement message 20B and the MAC address that is associated with the global network address of network interface 8B, as stored in network device 10A, network device 10A may determine that the tentative link-local address it had previously generated for network interface 8A is no longer a duplicate of the link-local address of network interface 8B.

In response to determining that the link-local address network device 10A had previously generated for network interface 8A is no longer a duplicate of the new link-local address of network interface 8B, network device 10A may re-perform duplicate address detection for the previously-generated link-local address by sending another neighbor solicitation message, such as neighbor solicitation message 16A, that includes an indication of the tentative link-local address to the other network devices 10B-10N in network segment 4 (74). If none of network devices 10B-10N sends a neighbor advertisement message in response to the neighbor solicitation message 16A to indicate that the tentative link-local address indicated in neighbor solicitation message 16A is duplicative of a link-local address that is currently assigned to one of network interfaces 8B-8Q, network device 10A may not receive a neighbor advertisement message in response to neighbor solicitation message 16A.

In response to network device 10A failing to receive a neighbor advertisement message in response to neighbor solicitation message 16A, network device 10A may determine that the tentative link-local address generated for network interface 8A is not duplicative of any one of the plurality of link-local addresses associated with any other network interface in network segment 4, and may assign the tentative link-local address as the link-local address for network interface 8A (76).

As shown in FIG. 4B, network device 10A may generate a tentative global network address for network interface 8A (82) and may perform duplicate address detection by sending a neighbor solicitation message, such as neighbor solicitation message 16B shown in FIG. 1B, that includes an indication of the generated tentative global network address to other network devices 10B-10N in network segment 4 (84).

Network device 10B may receive the neighborhood solicitation message (86) and may, in response to receiving neighbor solicitation message 16B and further in response to determining that the tentative global network address indicated in neighborhood solicitation message 16B is a duplicate of the global network address assigned to network interface 8B, send a neighbor advertisement message, such as neighbor advertisement message 18B, to network device 10A, to indicate that the tentative global network address indicated in neighborhood solicitation message 16B is a duplicate of the global network address assigned to network interface 8B (88).

Network device 10A may receive neighborhood advertisement message 18B from network device 10B (90) and may, in response, determine that the tentative global network address generated for network interface 8A is a duplicate of the global network address assigned network interface 8B (92). In response to determining that the tentative global network address generated for network interface 8A is a duplicate of the global network address assigned network interface 8B, network device 10A may track network interface 8B (94). Network device 10A may track network interface 8B by storing an association of the global network address assigned to network interface 8B with the MAC address assigned to network interface 8B, such as in data structure 40A shown in FIG. 3A.

After sending neighbor advertisement message 18B indicating that the global network address indicated in the neighborhood solicitation message is a duplicate of the global network address associated with network interface 8B, network device 10B may, at a later point in time, assign a new global network address to network interface 8B (96). In response to a new global network address being assigned to network interface 8B, network device 10B may send an unsolicited neighbor advertisement message, such as unsolicited neighbor advertisement message 20B, to other network devices in network segment 4 (98).

Network device 10A may receive unsolicited neighbor advertisement message 20B from network device 10B (100) and may determine, based on unsolicited neighbor advertisement message 20B, whether a new global network address is assigned to network interface 8B tracked by network device 10A (102). Determining whether a new global network address is assigned to network interface 8B tracked by network device 10A includes determining whether unsolicited neighbor advertisement message 20B pertains to a network interface that network device 10A is tracking, such as network interface 8B and, if so, whether unsolicited neighbor advertisement message 20B indicates that a new global network address is assigned to network interface 8B tracked by network device 10A.

Network device 10A may determine whether unsolicited neighbor advertisement message 20B pertains to a network interface that network device 10A is tracking, such as network interface 8B based on the information stored in unsolicited neighbor advertisement message 20B. For example, network device 10A may determine whether the MAC address indicated by unsolicited neighbor advertisement message 20B matches the MAC address assigned to network interface 8B as stored in network device 10A and, if there is a match, determine that unsolicited neighbor advertisement message 20B pertains to network interface 8B being tracked by network device 10A.

In response to determining that the message pertains to network interface 8B being tracked by network device 10A, network device 10A may determine whether the message indicates a new global network address has been assigned to network interface 8B. Network device may compare the global network address assigned to network interface 8B as indicated in unsolicited neighbor advertisement message 20B with the global network address that is associated with the MAC address of network interface 8B, as stored in network device 10A. If there is not a match between the global network address indicated in unsolicited neighbor advertisement message 20B and the global network address that is associated with the MAC address of network interface 8B, as stored in network device 10A, network device 10A may determine that the tentative global network address it had previously generated for network interface 8A is no longer a duplicate of the global network address of network interface 8B.

In response to determining that the global network address network device 10A had previously generated for network interface 8A is no longer a duplicate of the new global network address of network interface 8B, network device 10A may re-perform duplicate address detection for the previously-generated global network address by sending another neighbor solicitation message, such as neighbor solicitation message 16B, that includes an indication of the tentative global network address to the other network devices 10B-10N in network segment 4 (104). If none of network devices 10B-10N sends a neighbor advertisement message in response to the neighbor solicitation message 16B to indicate that the tentative link-local address indicated in neighbor solicitation message 16B is duplicative of a global network address that is currently assigned to one of network interfaces 8B-8Q, network device 10A may not receive a neighbor advertisement message in response to neighbor solicitation message 16B.

In response to network device 10A failing to receive a neighbor advertisement message in response to neighbor solicitation message 16B, network device 10A may determine that the tentative global network address generated for network interface 8A is not duplicative of any one of the plurality of global network addresses associated with any other network interface in network segment 4, and may assign the tentative global network address as the link-local address for network interface 8A (106).

Figure 5:
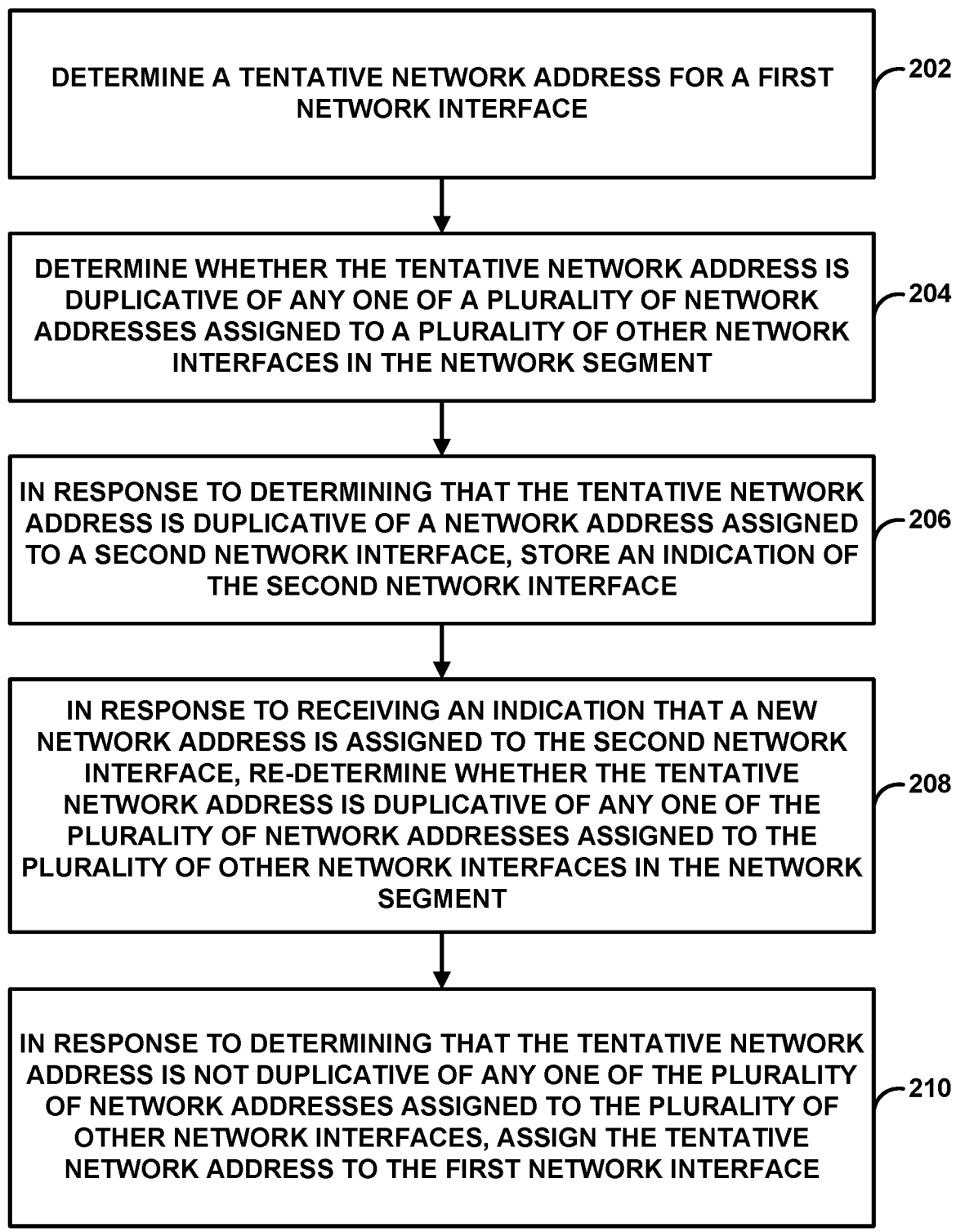
FIG. 5 is a flowchart illustrating an example process for performing automatic recovery from generating a duplicate network address in accordance with the techniques described in this disclosure.

FIG. 5 is a flowchart illustrating an example process for performing automatic recovery from generating a duplicate link-local address in accordance with the techniques described in this disclosure. FIG. 5 is illustrated with respect to network system 2 of FIGS. 1A and 1B and network devices 10A and 10B of FIGS. 1A and 1B. The techniques illustrated in FIG. 5 as being performed by network device 10A may be performed by, for example, duplicate address recovery application 12 that executes at network device 10A. As shown in FIG. 5, network device 10A in a network segment 4 may determine a tentative network address for a first network interface 8A associated with the network device 10A (202). Network device 10A may determine whether the tentative network address is duplicative of any one of a plurality of network addresses assigned to a plurality of other network interfaces 8B-8Q associated with a plurality of other network devices 10B-10N in the network segment 4 (204). Network device 10A may, in response to determining that the tentative network address is duplicative of a network address assigned to a second network interface 8B of the plurality of other network interfaces 8B-8Q, store an indication of the second network interface 8B, such as in data store 14 (206). Network device 10A may, in response to receiving an indication that a new network address is assigned to the second network interface 8B, re-determine whether the tentative network address is duplicative of any one of the plurality of network addresses assigned to the plurality of other network interfaces 8B-8Q associated with the plurality of other network devices 10A-10N in the network segment 4 (208). Network device 10A may, in response to determining that the tentative network address is not duplicative of any one of the plurality of network addresses assigned to the plurality of other network interfaces 8B-8Q associated with the plurality of other network devices 10A-10N in the network segment 4, assign the tentative network address to the first network interface 8A (210).

In some examples, the tentative network address for the first network interface 8A comprises a tentative global network address for the first network interface 8A, the plurality of network addresses assigned to the plurality of other network interfaces 8B-8Q comprises a plurality of global network addresses assigned to the plurality of other network interfaces 8B-8Q, the network address assigned to the second network interface 8B comprises a global network address assigned to the second network interface 8B, and the new network address comprises a new global network address. In some examples, storing the indication of the second network interface 8B includes storing an indication of a Media Access Control (MAC) address assigned to the second network interface 8B.

In some examples, network device 10A may receive an unsolicited neighbor advertisement message 20B from one of the plurality of other network interfaces 8A-8Q associated with the plurality of other network devices 10B-10N, where the unsolicited neighbor advertisement message 20B includes an indication of a MAC address. Network device 10A may, in response to receiving the unsolicited neighbor advertisement message 20B, determine whether the MAC address assigned to the second network interface 8B is the same as the MAC address indicated by the unsolicited neighbor advertisement message 20B. Network device 10A may, in response to determining that the MAC address assigned to the second network interface 8B is the same as the MAC address indicated by the unsolicited neighbor advertisement message 20B, determine that the unsolicited neighbor advertisement message 20B indicates that the new global network address is assigned to the second network interface 8B.

In some examples, the tentative network address for the first network interface 8A comprises a tentative link-local address for the first network interface 8A, the plurality of network addresses assigned to the plurality of other network interfaces 8B-8Q comprises a plurality of link-local addresses assigned to the plurality of other network interfaces 8B-8Q, the network address assigned to the second network interface 8B comprises a link-local address assigned to the second network interface 8B, and the new network address comprises a new link-local address. In some examples, the link-local address assigned to the second network interface 8B is determined based at least in part on a MAC address assigned to the second network interface 8B, such as when the link-local address is in a 64-bit Extended Unique Identifier (EUI-64) format, and where storing the indication of the second network interface 8B comprises storing an indication of the global network address assigned to the second network interface 8B and an indication of the MAC address assigned to the second network interface.

In some examples, network device 10A may receive an unsolicited neighbor advertisement message 20A that includes an indication of a global network address and an indication of a MAC address. Network device 10A may, in response to receiving the unsolicited neighbor advertisement message 20A, determine whether the global network address assigned to the second network interface 8B is the same as the global network address indicated in the unsolicited neighbor advertisement message 20A and whether the MAC address assigned to the second network interface 8B is the same as the MAC address indicated in the unsolicited neighbor advertisement message 20A. Network device 10A may, in response to determining that the global network address assigned to the second network interface 8B is the same as the global network address indicated in the unsolicited neighbor advertisement message 20A and that the MAC address indicated in the unsolicited neighbor advertisement message 20A is different from the MAC address assigned to the second network interface, determine that the unsolicited neighbor advertisement message 20A indicates that the new global network address is assigned to the second network interface 8B.

In some examples, determining, whether the tentative network address is duplicative of any one of the plurality of network addresses assigned to the plurality of other network interfaces 8B-8Q associated with the plurality of other network devices 10A-10N in the network segment 4 may further include sending, by the network device 10A to the plurality of other network interfaces 8B-8Q associated with the plurality of other network devices 10A-10N in the network segment 4, a neighbor solicitation message 16A or 16B that includes an indication of the tentative network address, and in response to receiving a neighbor advertisement message 18A or 18B from the second network interface 8B that is in response to the neighbor solicitation message 16A or 16B, determining, by the network device 10A, that the tentative network address is duplicative of the network address assigned to the second network interface 8B in the network segment 4.

In some examples, re-determining, whether the tentative network address is duplicative of any one of the plurality of network addresses assigned to the plurality of other network interfaces 8B-8Q associated with the plurality of other network devices 10A-10N in the network segment 4 may further include sending, by the network device 10A to the plurality of other network interfaces 8B-8Q associated with the plurality of other network devices 10A-10N in the network segment 4, a neighbor solicitation message 16A or 16B that includes an indication of the tentative network address and in response to not receiving a neighbor advertisement message that is in response to the neighbor solicitation message 16A or 16B, determining, by the network device 10A, that the tentative network address is not duplicative of any one of the plurality of network addresses assigned to the plurality of other network interfaces 8B-8Q associated with the plurality of other network devices 10A-10N in the network segment 4.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including processing circuitry implementing one or more processors as described above, in conjunction with suitable software and/or firmware.

Various embodiments of the techniques have been described. These and other embodiments are within the scope of the following claims.

The invention claimed is:

1. A method comprising:
   determining, by a network device in a network segment, a tentative network address for a first network interface associated with the network device;
   determining, by the network device, whether the tentative network address is duplicative of any one of a plurality of network addresses assigned to a plurality of other network interfaces associated with a plurality of other network devices in the network segment, including:
      sending, by the network device to the plurality of other network interfaces associated with the plurality of other network devices in the network segment, a neighbor solicitation message that includes an indication of the tentative network address, and
      in response to receiving a neighbor advertisement message from a second network interface that is in response to the neighbor solicitation message, determining, by the network device, that the tentative network address is duplicative of the network address assigned to the second network interface in the network segment;
   in response to determining that the tentative network address is duplicative of a network address assigned to the second network interface of the plurality of other network interfaces, storing, by the network device in memory of the network device, an indication of the second network interface assigned the network address that is duplicative of the tentative network address;
   determining, by the network device and based at least in part on the indication of the second network interface stored in the memory of the network device, whether an unsolicited neighborhood advertisement message received by the network device indicates that a new network address is assigned to the second network interface;
   in response to determining that the unsolicited neighbor advertisement message indicates that the new network address is assigned to the second network interface, re-determining, by the network device, whether the tentative network address is duplicative of any one of the plurality of network addresses assigned to the plurality of other network interfaces associated with the plurality of other network devices in the network segment; and
   in response to determining that the tentative network address is not duplicative of any one of the plurality of network addresses assigned to the plurality of other network interfaces associated with the plurality of other network devices in the network segment, assigning, by the network device, the tentative network address to the first network interface.

2. The method of claim 1, wherein:
   the tentative network address for the first network interface comprises a tentative global network address for the first network interface;
   the plurality of network addresses assigned to the plurality of other network interfaces comprises a plurality of global network addresses assigned to the plurality of other network interfaces;
   the network address assigned to the second network interface comprises a global network address assigned to the second network interface;
   the new network address comprises a new global network address; and
   storing the indication of the second network interface comprises storing an indication of a Media Access Control (MAC) address assigned to the second network interface.

3. The method of claim 2, wherein determining, based at least in part on the indication of the second network interface stored in the memory of the network device, whether the unsolicited neighborhood advertisement message received by the network device indicates that a new network address is assigned to the second network interface further comprises:
   receiving, by the network device, the unsolicited neighbor advertisement message from one of the plurality of other network interfaces associated with the plurality of other network devices in the network segment, wherein the unsolicited neighbor advertisement message includes an indication of a MAC address;

in response to receiving the unsolicited neighbor advertisement message, determining, by the network device, whether the MAC address assigned to the second network interface is the same as the MAC address indicated in the unsolicited neighbor advertisement message; and in response to determining that the MAC address is assigned to the second network interface is the same as the MAC address indicated in the unsolicited neighbor advertisement message, determining, by the network device, that the unsolicited neighbor advertisement message indicates that the new global network address is assigned to the second network interface.

4. The method of claim 1, wherein:

the tentative network address for the first network interface comprises a tentative link-local address for the first network interface;

the plurality of network addresses assigned to the plurality of other network interfaces comprises a plurality of link-local addresses assigned to the plurality of other network interfaces;

the network address assigned to the second network interface comprises a link-local address assigned to the second network interface;

the new network address comprises a new link-local address; and the link-local address assigned to the second network interface is determined based at least in part on a MAC address assigned to the second network interface, and wherein storing the indication of the other network interface comprises storing an indication of the global network address assigned to the second network interface and an indication of the MAC address assigned to the second network interface.

5. The method of claim 4, wherein determining, based at least in part on the indication of the second network interface stored in the memory of the network device, whether the unsolicited neighborhood advertisement message received by the network device indicates that a new network address is assigned to the second network interface further comprises:

receiving, by the network device, the unsolicited neighbor advertisement message from one of the plurality of other network interfaces associated with the plurality of other network devices in the network segment, wherein the unsolicited neighbor advertisement message includes an indication of a global network address and an indication of a MAC address;

in response to receiving the unsolicited neighbor advertisement message, determining, by the network device, whether the global network address assigned to the second network interface is the same as the global network address indicated in the unsolicited neighbor advertisement message and whether the MAC address assigned to the second network interface is the same as the MAC address indicated in the unsolicited neighbor advertisement message; and in response to determining that the global network address assigned to the second network interface is the same as the global network address indicated in the unsolicited neighbor advertisement message and that the MAC address indicated in the unsolicited neighbor advertisement message is different from the MAC address which was assigned to the second network interface, determining, by the network device, that the unsolicited neighbor advertisement message indicates that the new link-local address is assigned to the second network interface.

6. The method of claim 1, wherein re-determining whether the tentative network address is duplicative of any one of the plurality of network addresses assigned to the plurality of other network interfaces associated with the plurality of other network devices in the network segment comprises:

sending, by the network device to the plurality of other network interfaces associated with the plurality of other network devices in the network segment, a neighbor solicitation message that includes an indication of the tentative network address; and in response to not receiving a neighbor advertisement message that is in response to the neighbor solicitation message, determining, by the network device, that the tentative network address is not duplicative of any one of the plurality of network addresses assigned to the other network interfaces associated with the plurality of other network devices in the network segment.

7. A network device comprising:

a first network interface connectable to a network segment;

a memory; and processing circuitry operably coupled to the memory and the network interface, the processing circuitry is configured to:

determine a tentative network address in the network segment for the first network interface of the network device;

determine whether the tentative network address is duplicative of any one of a plurality of network addresses assigned to a plurality of other network interfaces associated with a plurality of other network devices in the network segment, including:

sending, to the plurality of other network interfaces associated with the plurality of other network devices in the network segment, a neighbor solicitation message that includes an indication of the tentative network address and an indication of a MAC address, and in response to receiving a neighbor advertisement message from a second network interface that is in response to the neighbor solicitation message, determining that the tentative network address is duplicative of the network address assigned to the second network interface in the network segment;

in response to determining that the tentative network address is duplicative of a network address assigned to the second network interface of the plurality of other network interfaces, store an indication of the second network interface assigned the network address that is duplicative of the tentative network address in the memory;

determine, based at least in part on the indication of the second network interface stored in the memory, whether an unsolicited neighborhood advertisement message received by the network device indicates that a new network address is assigned to the second network interface;

in response determining that the unsolicited neighbor advertisement message indicates that the new network address is assigned to the second network interface, re-determine whether the tentative network address is duplicative of any one of the plurality of network addresses assigned to the plurality of other network interfaces associated with the plurality of other network devices in the network segment; and in response to determining that the tentative network address is not duplicative of any one of the plurality of network addresses assigned to the plurality of other network interfaces associated with the plurality of other network devices in the network segment, assign the tentative network address to the first network interface.

8. The network device of claim 7, wherein:
the tentative network address for the first network interface comprises a tentative global network address for the first network interface;
the plurality of network addresses assigned to the plurality of other network interfaces comprises a plurality of global network addresses assigned to the plurality of other network interfaces;
the network address assigned to the second network interface comprises a global network address assigned to the second network interface;
the new network address comprises a new global network address; and
the processing circuitry is further configured to store an indication of a Media Access Control (MAC) address assigned to the second network interface in the memory of the network device.

9. The network device of claim 8, wherein the processing circuitry is further configured to:
receive the unsolicited neighbor advertisement message from one of the plurality of other network interfaces associated with the plurality of other network devices in the network segment, wherein the unsolicited neighbor advertisement message includes an indication of a MAC address;
in response to receiving the unsolicited neighbor advertisement message, determine whether the MAC address assigned to the second network interface is the same as the MAC address indicated in the unsolicited neighbor advertisement message; and
in response to determining that the MAC address is assigned to the second network interface is the same as the MAC address indicated in the unsolicited neighbor advertisement message, determine that the unsolicited neighbor advertisement message indicates that the new global network address is assigned to the second network interface.

10. The network device of claim 7, wherein:
the tentative network address for the first network interface comprises a tentative link-local address for the first network interface;
the plurality of network addresses assigned to the plurality of other network interfaces comprises a plurality of link-local addresses assigned to the plurality of other network interfaces;
the network address assigned to the second network interface comprises a link-local address assigned to the second network interface;
the new network address comprises a new link-local address; and
the link-local address assigned to the second network interface is determined based at least in part on a MAC address assigned to the second network interface, and wherein the processing circuitry is further configured to store an indication of the global network address assigned to the second network interface and an indication of the MAC address assigned to the second network interface in the memory of the network device.

11. The network device of claim 10, wherein the processing circuitry is further configured to:
receive the unsolicited neighbor advertisement message from one of the plurality of other network interfaces associated with the plurality of other network devices in the network segment, wherein the unsolicited advertisement message includes an indication of a global network address and an indication of a MAC address;
in response to receiving the unsolicited neighbor advertisement message, determine whether the global network address assigned to the second network interface is the same as the global network address indicated in the unsolicited neighbor advertisement message and whether the MAC address assigned to the second network interface is the same as the MAC address indicated in the unsolicited neighbor advertisement message; and
in response to determining that the global network address assigned to the second network interface is the same as the global network address indicated in the unsolicited neighbor advertisement message and that the MAC address indicated in the unsolicited neighbor advertisement message is different from the MAC address assigned to the second network interface, determine that the unsolicited neighbor advertisement message indicates that the new link-local address is assigned to the second network interface.

12. The network device of claim 7, wherein the processing circuitry that is configured to re-determine whether the tentative network address is duplicative of any one of the plurality of network addresses assigned to the plurality of other network interfaces associated with the plurality of other network devices in the network segment is further configured to:
send, to the plurality of other network interfaces associated with the plurality of other network devices in the network segment, a neighbor solicitation message that includes an indication of the tentative network address; and
in response to not receiving a neighbor advertisement message that is in response to the neighbor solicitation message, determine that the tentative network address is not duplicative of any one of the plurality of network addresses assigned to the other network interfaces associated with the plurality of other network devices in the network segment.

13. A non-transitory computer-readable storage medium of a network device storing instructions that, when executed by processing circuitry of the network device, cause the processing circuitry of the network device to:
determine a tentative network address in a network segment for a first network interface associated with the network device;
determine whether the tentative network address is duplicative of any one of a plurality of network addresses assigned to a plurality of other network interfaces associated with a plurality of other network devices in the network segment, including:
sending, to the plurality of other network interfaces associated with the plurality of other network devices in the network segment, a neighbor solicitation message that includes an indication of the tentative network address; and
in response to receiving a neighbor advertisement message from a second network interface that is in response to the neighbor solicitation message, determining that the tentative network address is duplicative of the network address assigned to the second network interface in the network segment;

in response to determining that the tentative network address is duplicative of a network address assigned to second network interface of the plurality of other network interfaces, store an indication of the second network interface assigned the network address that is duplicative of the tentative network address in memory of the network device;

determine, based at least in part on the indication of the second network interface stored in the memory of the network device, whether an unsolicited neighborhood advertisement message received by the network device indicates that a new network address is assigned to the second network interface;

in response to determining that the unsolicited neighbor advertisement message indicates that the new network address is assigned to the second network interface, re-determine whether the tentative network address is duplicative of any one of the plurality of network addresses assigned to the plurality of other network interfaces associated with the plurality of other network devices in the network segment; and in response to determining that the tentative network address is not duplicative of any one of the plurality of network addresses assigned to the plurality of other network interfaces associated with the plurality of other network devices in the network segment, assign the tentative network address to the first network interface.

14. The non-transitory computer-readable storage medium of claim 13, wherein:

the tentative network address for the first network interface comprises a tentative global network address for the first network interface;

the plurality of network addresses assigned to the plurality of other network interfaces comprises a plurality of global network addresses assigned to the plurality of other network interfaces;

the network address assigned to the second network interface comprises a global network address assigned to the second network interface;

the new network address comprises a new global network address; and the instructions, when executed by the processing circuitry of the network device, further cause the processing circuitry of the network device to store an indication of a Media Access Control (MAC) address assigned to the second network interface.

15. The non-transitory computer-readable storage medium of claim 14, wherein the instructions, when executed by the processing circuitry of the network device, further cause the processing circuitry of the network device to:

receive the unsolicited neighbor advertisement message from one of the plurality of other network interfaces associated with the plurality of other network devices in the network segment, wherein the unsolicited neighbor advertisement message includes an indication of a MAC address;

in response to receiving the unsolicited neighbor advertisement message, determine whether the MAC address assigned to the second network interface is the same as the MAC address indicated in the unsolicited neighbor advertisement message; and in response to determining that the MAC address is assigned to the second network interface is the same as the MAC address indicated in the unsolicited neighbor advertisement message, determine that the unsolicited neighbor advertisement message indicates that the new global network address is assigned to the second network interface.

16. The non-transitory computer-readable storage medium of claim 13, wherein:

the tentative network address for the first network interface comprises a tentative link-local address for the first network interface;

the plurality of network addresses assigned to the plurality of other network interfaces comprises a plurality of link-local addresses assigned to the plurality of other network interfaces;

the network address assigned to the second network interface comprises a link-local address assigned to the second network interface;

the new network address comprises a new link-local address; and the link-local address assigned to the second network interface is determined based at least in part on a MAC address assigned to the second network interface, and wherein the instructions, when executed by the processing circuitry of the network device, further cause the processing circuitry of the network device to store an indication of the global network address assigned to the second network interface and an indication of the MAC address assigned to the second network interface.

17. The non-transitory computer-readable storage medium of claim 16, wherein the instructions, when executed by the processing circuitry of the network device, further cause the processing circuitry of the network device to:

receive the unsolicited neighbor advertisement message from one of the plurality of other network interfaces associated with the plurality of other network devices in the network, wherein the unsolicited neighbor advertisement message includes an indication of a global network address and an indication of a MAC address;

in response to receiving the unsolicited neighbor advertisement message, determine whether the global network address assigned to the second network interface is the same as the global network address indicated in the unsolicited neighbor advertisement message and whether the MAC address assigned to the second network interface is the same as the MAC address indicated in the unsolicited neighbor advertisement message; and in response to determining that the global network address assigned to the second network interface is the same as the global network address indicated in the unsolicited neighbor advertisement message and that the MAC address indicated in the unsolicited neighbor advertisement message is different from the MAC address assigned to the second network interface, determine that the unsolicited neighbor advertisement message indicates that the new link-local address is assigned to the second network interface.

* * * * *